(12) United States Patent
Bi et al.

(10) Patent No.: US 12,245,186 B2
(45) Date of Patent: Mar. 4, 2025

(54) METHOD AND APPARATUS FOR REALIZING UPLINK POSITIONING, AND STORAGE MEDIUM

(71) Applicant: ZTE Corporation, Guangdong (CN)

(72) Inventors: Cheng Bi, Guangdong (CN); Yifei Yuan, Guangdong (CN); Shijun Chen, Guangdong (CN); Wanfu Xu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 737 days.

(21) Appl. No.: 17/607,355

(22) PCT Filed: Apr. 26, 2020

(86) PCT No.: PCT/CN2020/086945
§ 371 (c)(1),
(2) Date: Oct. 28, 2021

(87) PCT Pub. No.: WO2020/221149
PCT Pub. Date: Nov. 5, 2020

(65) Prior Publication Data
US 2022/0210761 A1   Jun. 30, 2022

(30) Foreign Application Priority Data
Apr. 29, 2019  (CN) .......................... 201910360386.X

(51) Int. Cl.
*H04W 64/00* (2009.01)
*H04W 24/08* (2009.01)
*H04W 74/0833* (2024.01)

(52) U.S. Cl.
CPC ......... *H04W 64/003* (2013.01); *H04W 24/08* (2013.01); *H04W 74/0833* (2013.01)

(58) Field of Classification Search
CPC ............... H04W 64/003; H04W 24/08; H04W 74/0833; H04W 12/104; H04W 64/00;
(Continued)

(56) References Cited

U.S. PATENT DOCUMENTS

| 2014/0044108 A1 | 2/2014 | Earnshaw et al. |
| 2014/0274160 A1 | 9/2014 | Xiao et al. |

(Continued)

FOREIGN PATENT DOCUMENTS

| CN | 101772159 A | 7/2010 |
| CN | 103582117 A | 2/2014 |

(Continued)

OTHER PUBLICATIONS

International Search Report mailed Jul. 14, 2020 in connection with International Application No. PCT/CN2020/086945.

(Continued)

*Primary Examiner* — Sharmin Chowdhury
(74) *Attorney, Agent, or Firm* — Wolf, Greenfield & Sacks, P.C.

(57) ABSTRACT

Provided are a method and an apparatus for implementing uplink positioning and a storage medium. The method includes: sending a first positioning instruction to a first measurement node set, where the first measurement node set includes at least three measurement nodes and a target node is located within a coverage range of the measurement nodes; receiving first positioning attribute information fed back by each measurement node and corresponding to the first positioning instruction, where the first positioning attribute information includes a measurement node identity and random access information of a cell where the measurement node is located; and sending a random access instruction carrying the first positioning attribute information to the target node, where the random access instruction is config- (Continued)

ured to trigger the target node to send a random access signal to the each measurement node to determine a communication distance between the target node and the each measurement node.

7 Claims, 10 Drawing Sheets

(58) Field of Classification Search
CPC .. H04W 72/23; G01S 5/0215; G01S 5/02213; Y02D 30/70
See application file for complete search history.

(56) References Cited

U.S. PATENT DOCUMENTS

| | | | | |
|---|---|---|---|---|
| 2017/0303220 | A1* | 10/2017 | Sadeghi | H04L 5/0048 |
| 2018/0242101 | A1* | 8/2018 | Lin | H04W 4/02 |
| 2018/0324853 | A1 | 11/2018 | Jeon et al. | |
| 2019/0053071 | A1 | 2/2019 | Ly | |
| 2021/0337501 | A1* | 10/2021 | Si | H04W 52/02 |
| 2022/0191815 | A1* | 6/2022 | Berggren | H04W 64/006 |

FOREIGN PATENT DOCUMENTS

| | | |
|---|---|---|
| CN | 105578404 A | 5/2016 |
| CN | 107404749 A | 11/2017 |
| CN | 109526003 A | 3/2019 |
| CN | 110536412 A | 12/2019 |
| KR | 10-2012-0005521 A | 1/2012 |
| KR | 10-2012-0034168 A | 4/2012 |
| KR | 10-2012-0114346 A | 10/2012 |
| WO | WO 2012/106798 A1 | 8/2012 |
| WO | WO 2018/159967 A1 | 9/2018 |
| WO | WO 2018/217323 A1 | 11/2018 |

OTHER PUBLICATIONS

[No Author Listed], RAT dependent NR positioning solutions. 3GPP TSG-RAN WG1 #95. R1-1813592. Ericsson. Nov. 2018. 17 pages.

[No Author Listed], Views on NR uplink positioning techniques. 3GPP TSG RAN WG1 #96. R1-1901715. Vivo Feb.-Mar. 2019. 5 pages.

Korean Request for the Submission of an Opinion dated Mar. 8, 2024, in connection with Korean Application No. 10-2021-7039032.

Chinese Office Action mailed May 7, 2022, in connection with Chinese Application No. 201910360386.X.

Extended European Search Report dated Dec. 9, 2022, in connection with European Application No. 20799302.3.

[No Author Listed], Co-ordination among UE,gNB and Location Server for PRS Configuration and Feedbacks. Ericsson. 3GPP TSG RAN WG1 96. R1-1903144. Feb. 15, 2019; 3 pages.

* cited by examiner

METHOD AND APPARATUS FOR REALIZING UPLINK POSITIONING, AND STORAGE MEDIUM

CROSS REFERENCES TO RELATED APPLICATIONS

This Application is a national stage filing under 35 U.S.C. 371 of International Patent Application Serial No. PCT/CN2020/086945, filed Apr. 26, 2020, entitled "METHOD AND APPARATUS FOR REALIZING UPLINK POSITIONING, AND STORAGE MEDIUM". Foreign priority benefits are claimed under 35 U.S.C. § 119 (a)-(d) or 35 U.S.C. § 365 (b) of Chinese application number 201910360386.X, filed Apr. 29, 2019. The entire contents of these applications are incorporated herein by reference in their entirety.

TECHNICAL FIELD

The present disclosure relates to the field of radio communication networks, for example, to a method and apparatus for implementing uplink positioning, and a storage medium.

BACKGROUND

Since Release 9, the 3rd generation partnership project (3GPP) has been introduced into the positioning technology. In the uplink positioning technology, multiple measurement nodes need to receive signals from a same target node, the adopted frequency band of the 4th generation mobile communication system (4G) is a low frequency band, and a cyclic prefix (CP) is long. However, the 5th generation mobile communication system (5G) frequency band includes high frequency bands, and the inter-symbol CP becomes shorter. If a send mechanism of an uplink reference signal of Long Term Evolution (LTE) is used, it will cause communication interference to other target nodes in adjacent measurement nodes.

SUMMARY

The present application provides a method and an apparatus for implementing uplink positioning, and a storage medium, which reduce communication interference for other target nodes in adjacent measurement nodes.

A method for implementing uplink positioning is provided in an embodiment of the present application and is applied to a positioning server. The method includes steps described below.

A first positioning instruction is sent to a first measurement node set, where the first measurement node set includes at least three measurement nodes, and a target node is located within a coverage range of the at least three measurement nodes.

First positioning attribute information fed back by each measurement node of the at least three measurement nodes and corresponding to the first positioning instruction is received, where the first positioning attribute information includes a measurement node identity and random access information of a cell where the each measurement node is located.

A random access instruction carrying the first positioning attribute information is sent to the target node, where the random access instruction is configured to trigger the target node to send a random access signal to the each measurement node to determine a communication distance between the target node and the each measurement node.

A method for implementing uplink positioning is further provided in an embodiment of the present application and is applied to a measurement node. The method includes steps described below.

A first positioning instruction sent by a positioning server is received.

First positioning attribute information corresponding to the first positioning instruction is extracted according to the first positioning instruction, where the first positioning attribute information includes a measurement node identity and random access information of a cell where the measurement node is located.

The first positioning attribute information is fed back to the positioning server, where the first positioning attribute information is attribute information of multiple measurement nodes with which a target node is to establish communication, and the first positioning attribute information includes a measurement node identity and random access information of a cell where the measurement node is located.

A method for implementing uplink positioning is further provided in an embodiment of the present application and is applied to a service node. The method includes steps described below.

A second positioning instruction sent by a positioning server is received.

A second measurement node set determined according to the second positioning instruction is fed back to the positioning server, where the second measurement node set includes at least two measurement nodes except the service node, a target node is located within a coverage range of the at least two measurement nodes, and one service cell provided by the service node has established a communication connection with the target node.

Second positioning attribute information fed back by each measurement node of the at least two measurement nodes is received, where the second positioning attribute information includes a measurement node identity and random access information of a cell where the each measurement node is located.

Downlink control information (DCI) carrying the second positioning attribute information is sent to the target node, where the DCI is used for triggering the target node to send a random access signal to the each measurement node to determine a communication distance between the target node and the each measurement node.

A method for implementing uplink positioning is further provided in an embodiment of the present application and is applied to a positioning server. The method includes steps described below.

A second positioning instruction is sent to a service node, where one service cell provided by the service node has established a communication connection with a target node.

A second measurement node set fed back by the service node is received, where the second measurement node set is determined according to the second positioning instruction, the second measurement node set includes at least two measurement nodes except the service node, and the target node is located within a coverage range of the at least two measurement nodes.

A first positioning activation instruction carrying a service node identity is sent to each measurement node of the at least two measurement nodes, where the first positioning activation instruction is configured to trigger the each measurement node to send second positioning attribute information to the service node, the second positioning attribute information is attribute information of multiple measurement nodes with which the target node is to establish communication, and the second positioning attribute information includes a measurement node identity and random access information of a cell where the each measurement nodes is located.

A method for implementing uplink positioning is further provided in an embodiment of the present application and is applied to a target node. The method includes steps described below.

DCI sent by a service node is received, where one service cell provided by the service node has established a communication connection with the target node.

A random access signal is sent to a measurement node corresponding to the DCI according to the DCI, where the random access signal is used for determining a communication distance between the target node and each measurement node.

An apparatus for implementing uplink positioning is further provided in an embodiment of the present application and is applied to a positioning server. The apparatus includes a first sending module, a first receiving module and a second sending module.

The first sending module is configured to send a first positioning instruction to a first measurement node set, where the first measurement node set includes at least three measurement nodes, and a target node is located within a coverage range of the at least three measurement nodes.

The first receiving module is configured to receive first positioning attribute information fed back by each measurement node of the at least three measurement nodes and corresponding to the first positioning instruction, where the first positioning attribute information includes a measurement node identity and random access information of a cell where the each measurement node is located.

The second sending module is configured to send a random access instruction carrying the first positioning attribute information to the target node, where the random access instruction is configured to trigger the target node to send a random access signal to the each measurement node to determine a communication distance between the target node and the each measurement node.

An apparatus for implementing uplink positioning is further provided in an embodiment of the present application and is applied to a measurement node. The apparatus includes a second receiving module, an extraction module and a first feedback module.

The second receiving module is configured to receive a first positioning instruction sent by a positioning server.

The extraction module is configured to extract, according to the first positioning instruction, first positioning attribute information corresponding to the first positioning instruction, where the first positioning attribute information includes a measurement node identity and random access information of a cell where the measurement node is located.

The first feedback module is configured to feed back the first positioning attribute information to the positioning server, where the first positioning attribute information is attribute information of multiple measurement nodes with which a target node is to establish communication, and the first positioning attribute information includes a measurement node identity and random access information of a cell where the measurement node is located.

An apparatus for implementing uplink positioning is further provided in an embodiment of the present application and is applied to a service node. The apparatus includes a third receiving module, a second feedback module, a fourth receiving module and a third sending module.

The third receiving module is configured to receive a second positioning instruction sent by a positioning server.

The second feedback module is configured to feed back a second measurement node set determined according to the second positioning instruction to the positioning server, where the second measurement node set includes at least two measurement nodes except the service node, a target node is located within a coverage range of the at least two measurement nodes, and one service cell provided by the service node has established a communication connection with the target node.

The fourth receiving module is configured to receive second positioning attribute information fed back by each measurement node of the at least two measurement nodes, where the second positioning attribute information includes a measurement node identity and random access information of a cell where the each measurement node is located.

The third sending module is configured to send DCI carrying the second positioning attribute information to the target node, where the DCI is used for triggering the target node to send a random access signal to the each measurement node to determine communication distances between the target node and multiple measurement nodes.

An apparatus for implementing uplink positioning is further provided in an embodiment of the present application and is applied to a positioning server. The apparatus includes a fourth sending module, a fifth receiving module and a fifth sending module.

The fourth sending module is configured to send a second positioning instruction to a service node, where one service cell provided by the service node has established a communication connection with a target node.

The fifth receiving module is configured to receive a second measurement node set fed back by the service node, where the second measurement node set is determined according to the second positioning instruction, the second measurement node set includes at least two measurement nodes except the service node, and the target node is located within a coverage range of the at least two measurement nodes.

The fifth sending module is configured to send a first positioning activation instruction carrying a service node identity to each measurement node of the at least two measurement nodes, where the first positioning activation instruction is configured to trigger the each measurement node to send second positioning attribute information to the service node, the second positioning attribute information is attribute information of multiple measurement nodes with which the target node is to establish communication, and the second positioning attribute information includes a measurement node identity and random access information of a cell where the each measurement node is located.

An apparatus for implementing uplink positioning is further provided in an embodiment of the present application and is applied to a target node. The apparatus includes a sixth receiving module and a sixth sending module.

The sixth receiving module is configured to receive DCI sent by a service node, where one service cell provided by the service node has established a communication connection with the target node.

The sixth sending module is configured to send, according to the DCI, a random access signal to a measurement node corresponding to the DCI, where the random access signal is used for determining a communication distance between the target node and each measurement node.

A storage medium is further provided in an embodiment of the present application. The storage medium is configured to store a computer program, where the computer program, when executed by a processor, implements the method described in any embodiment of the present application.

DETAILED DESCRIPTION

Embodiments of the present application are described below in conjunction with the drawings.

Figure 1:
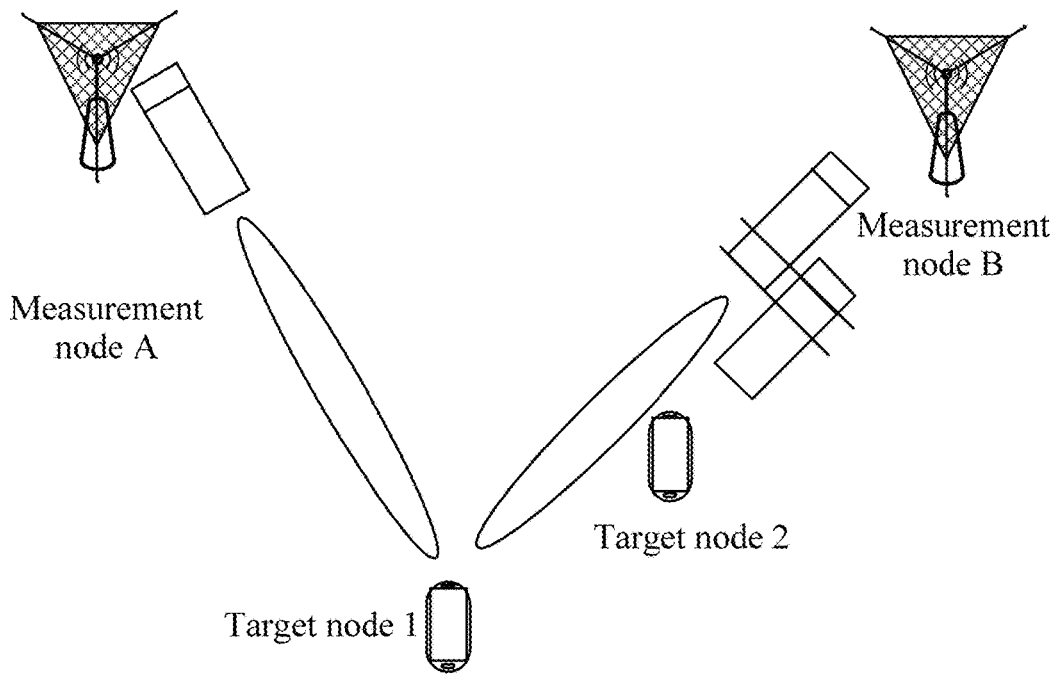
FIG. 1 is a schematic diagram of a communication scenario.

In a high-frequency scenario, CPs of symbols become shorter, and in the case where a time advance (TA) estimation of multiple measurement nodes is not performed, an uplink positioning reference signal of a target node and a signal of another target node in adjacent measurement nodes which reach the measurement node where the target node is located have symbol offsets exceeding the CP length, thus affecting the positioning performance and interfering the communication of the target node in the adjacent measurement nodes. FIG. 1 is a schematic diagram of a communication scenario. As shown in FIG. 1, there are two measurement nodes in a communication system, which are a measurement node A and a measurement node B respectively, and a serving base station to which a target node 1 belongs is the measurement node A. If the TA of the measurement node A and the TA of the measurement node B are not estimated, and an uplink positioning reference signal of the target node 1 which reaches the adjacent measurement node B has a symbol offset exceeding the CP length in high frequency scenario, thus affecting the positioning of the target node 1 and interfering the communication of a target node 2 in an adjacent measurement node B.

In the embodiment of the present application, a method for implementing uplink positioning is provided to avoid the influence on the positioning of the target node, thereby achieving accurate positioning of the target node and reducing communication interference to a terminal in an adjacent measurement node. In the embodiment, the measurement node is a base station, the target node is a user terminal, and a positioning server is a core network.

Figure 2:
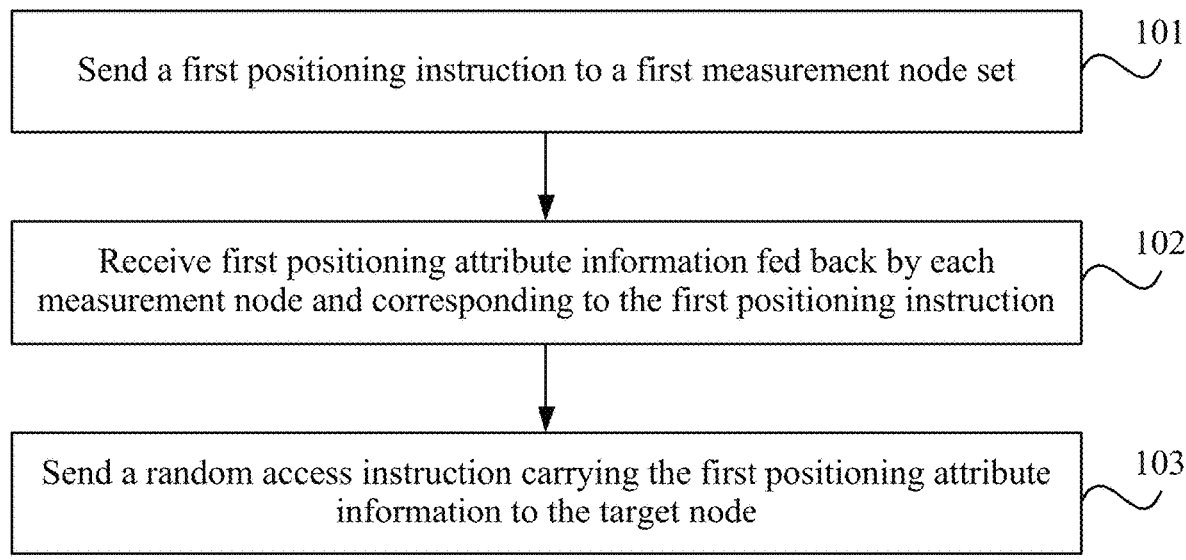
FIG. 2 is a flowchart of a method for implementing uplink positioning according to an embodiment.

In an embodiment, FIG. 2 is a flowchart of a method for implementing uplink positioning according to an embodiment. The method is executed by the positioning server to estimate TAs of multiple measurement nodes. As shown in FIG. 2, the method provided in this embodiment includes steps 101 to 103.

In step 101, a first positioning instruction is sent to a first measurement node set.

The first measurement node set includes at least three measurement nodes, and a target node is located within a coverage range of the at least three measurement nodes.

In step 102, first positioning attribute information fed back by each measurement node and corresponding to the first positioning instruction is received.

The first positioning attribute information includes a measurement node identity and random access information of a cell where the each measurement node is located.

In step 103, a random access instruction carrying the first positioning attribute information is sent to the target node.

The random access instruction is configured to trigger the target node to send a random access signal to the each measurement node to determine a communication distance between the target node and the each measurement node.

In the embodiment, in a case where the target node needs to be positioned, for example, in a case where the target node sends an uplink positioning request to the positioning server, or in a case where the target node needs to be positioned by the positioning server, the positioning server sends the first positioning instruction to the first measurement node set. The first measurement node set includes at least three measurement nodes, and the target node is located within a coverage range of multiple measurement nodes, that is, a communication range of all the measurement nodes in the first measurement node set may cover the target node. The first positioning instruction is an instruction for reporting an identity of each measurement node and random access information of a service cell where each measurement node is located. Each measurement node in the first measurement node set receives the first positioning instruction, and each measurement node reports a measurement node identity of the measurement node and random access information of a service cell where the measurement node is located. After the positioning server receives the measurement node identity of each measurement node and the random access information of the cell where each measurement node is located fed back by each measurement node, the positioning server issues the random access instruction to the target node, so that after receiving the random access instruction, the target node identifies an identity of each measurement node and the random access information of the cell where each measurement node is located, to transmit the random access signal to a corresponding measurement node. The random access information includes channel resource allocation information of a physical random access channel (PRACH) and the supported preamble information. The preamble information is a preamble code with a total of 64 bits, where the preamble code is the actual content sent by a user equipment in the PRACH and is composed of a CP with a length of Tcp and a sequence with a length of Tseq.

After the target node transmits the random access signal to each measurement node in the first measurement node set, the communication distance between the target node and each measurement node can be calculated through the time when each measurement node receives the random access signal, thereby achieving the positioning of the target node. After the communication distance between the target node and each measuring node is determined, transmission time when the target node transmits a signal to a corresponding measurement node can be adjusted according to each communication distance, to ensure that arrival time of the signal sent by the target node to each measurement node is the same and to avoid the communication interference to another target node in the adjacent measurement nodes.

In an embodiment, in a case where one measurement node in the first measurement node set is a service node, step 103 includes steps 1031 to 1032.

In step 1031, the first positioning attribute information is sent to the service node.

The service node is a base station cell which has established communication with the target node currently.

In step 1032, DCI carrying the first positioning attribute information is sent to the target node through the service node.

In the embodiment, in a case where one measurement node in the first measurement node set is the service node, the positioning server may send the identity of each measurement node in the first measurement node set and the random access information of the cell where each measurement node is located to the service node, and the identity of each measurement node and the random access information of the cell where each measurement node is located are sent to the target node through the service node. In an embodiment, after the service node receives the identity of each measurement node and the random access information of the cell where each measurement node is located, the service node configures at least two pieces of DCI and issues the at least two pieces of DCI to the target node. The target node is triggered through the pieces of DCI to transmit the random access signal to each measurement node to determine the communication distance between the target node and each measurement node. The number of pieces of downlink control information and the number of measurement nodes are the same, that is, each piece of downlink control information corresponds to first positioning attribute information of one measurement node.

Figure 3:
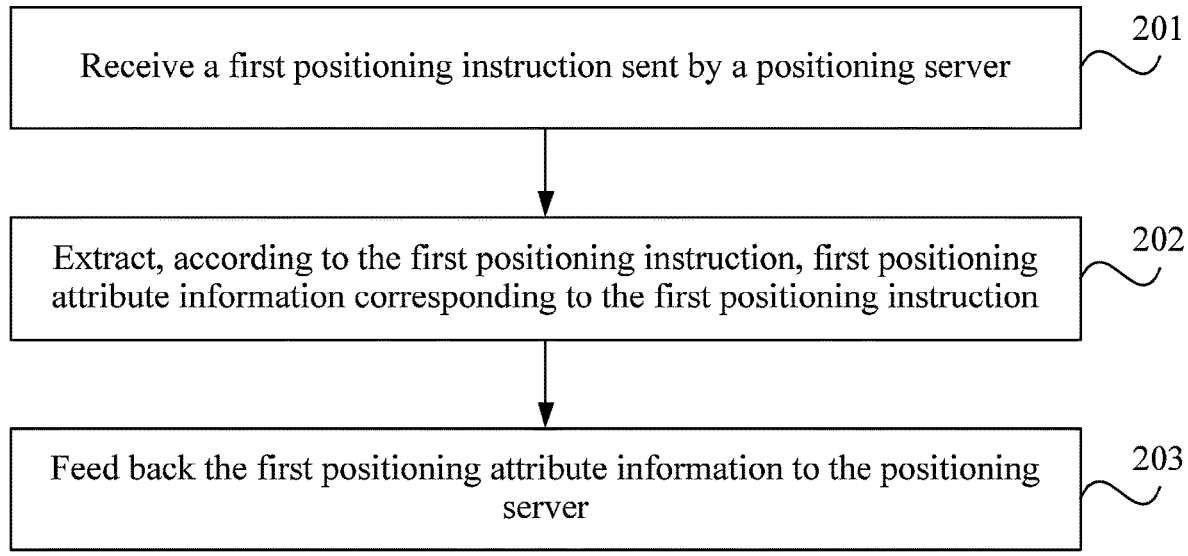
FIG. 3 is a flowchart of another method for implementing uplink positioning according to an embodiment.

In an embodiment, FIG. 3 is a flowchart of another method for implementing uplink positioning according to an embodiment. The method is executed by a measurement node to estimate TAs of multiple measurement nodes. As shown in FIG. 3, the method provided in this embodiment includes steps 201 to 203.

In step 201, a first positioning instruction sent by a positioning server is received.

In step 202, first positioning attribute information corresponding to the first positioning instruction is extracted according the first positioning instruction.

The first positioning attribute information includes a measurement node identity and random access information of a cell where the measurement node is located.

In step 203, the first positioning attribute information is fed back to the positioning server.

The first positioning attribute information is attribute information of multiple measurement nodes with which a target node is to establish communication, and the first positioning attribute information includes a measurement node identity and random access information of a cell where the measurement node is located.

In the embodiment, after each measurement node in a first measurement node set receives the first positioning instruction sent by the positioning server, each measurement node identifies and extracts the measurement node identity of the measurement node and the random access information of the cell where the measurement node is located from a preset database and sends the measurement node identity of the measurement node and the random access information of the cell where the measurement node is located to the positioning server, and thus the positioning server forwards the measurement node identity and the random access information of the cell where the measurement node is located to the target node, so that the target node transmits the random access signal to each measurement node.

Figure 4:
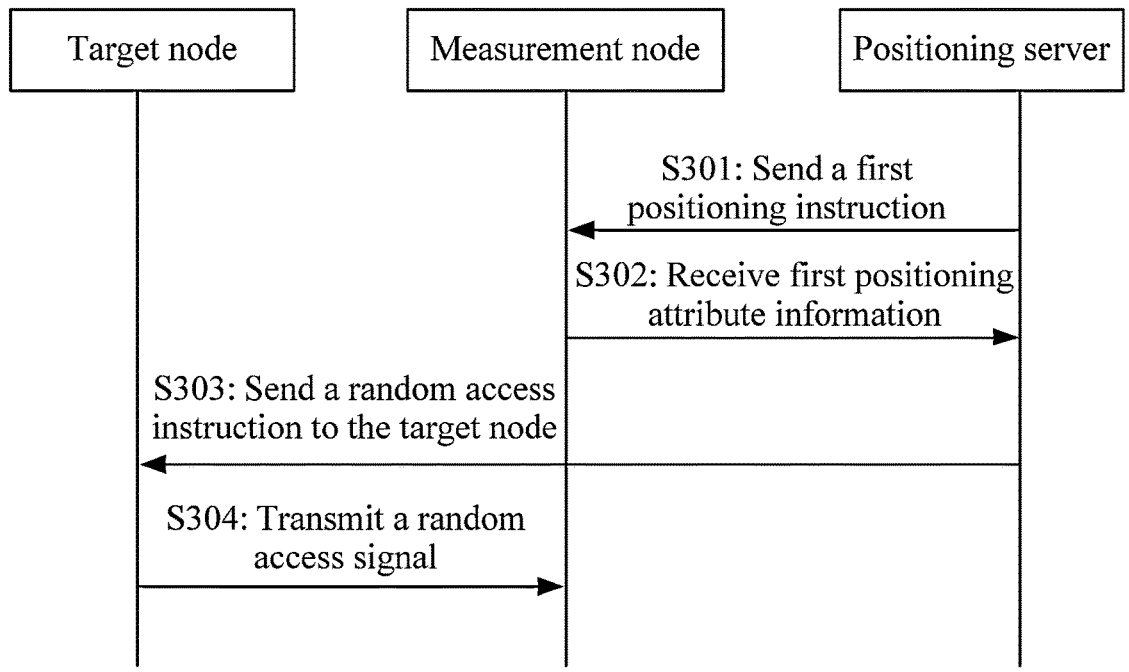
FIG. 4 is a schematic interaction diagram of a method for implementing uplink positioning according to an embodiment.

In an embodiment, FIG. 4 is a schematic interaction diagram of a method for implementing uplink positioning according to an embodiment. The method provided by the embodiment is suitable for estimating TAs of multiple measurement nodes under the scenario where a random access instruction is directly sent to a target node through a positioning server. As shown in FIG. 4, the method includes steps 301 to 304.

In step 301, a first positioning instruction is sent.

In step 302, first positioning attribute information is received.

In step 303, a random access instruction is sent to the target node.

In step 304, a random access signal is transmitted.

In the embodiment, the positioning server sends the first positioning instruction to each measurement node in a first measurement node set, and after receiving the first positioning instruction, each measurement node reports a measurement node identity of the measurement node and random access information of a cell where the measurement node is located to the positioning server. After the positioning server receives the identity of each measurement node and the random access information of the cell where each measurement node is located, the positioning server issues the random access instruction to the target node. After the target node receives the random access instruction, the target node transmits the random access signal to each measurement node according to the identity of each measurement node and the random access information of the cell where each measurement node is located. The random access instruction is a positioning measurement activation instruction, which triggers each measurement node to start receiving the random access signal sent by the target node.

Figure 5:
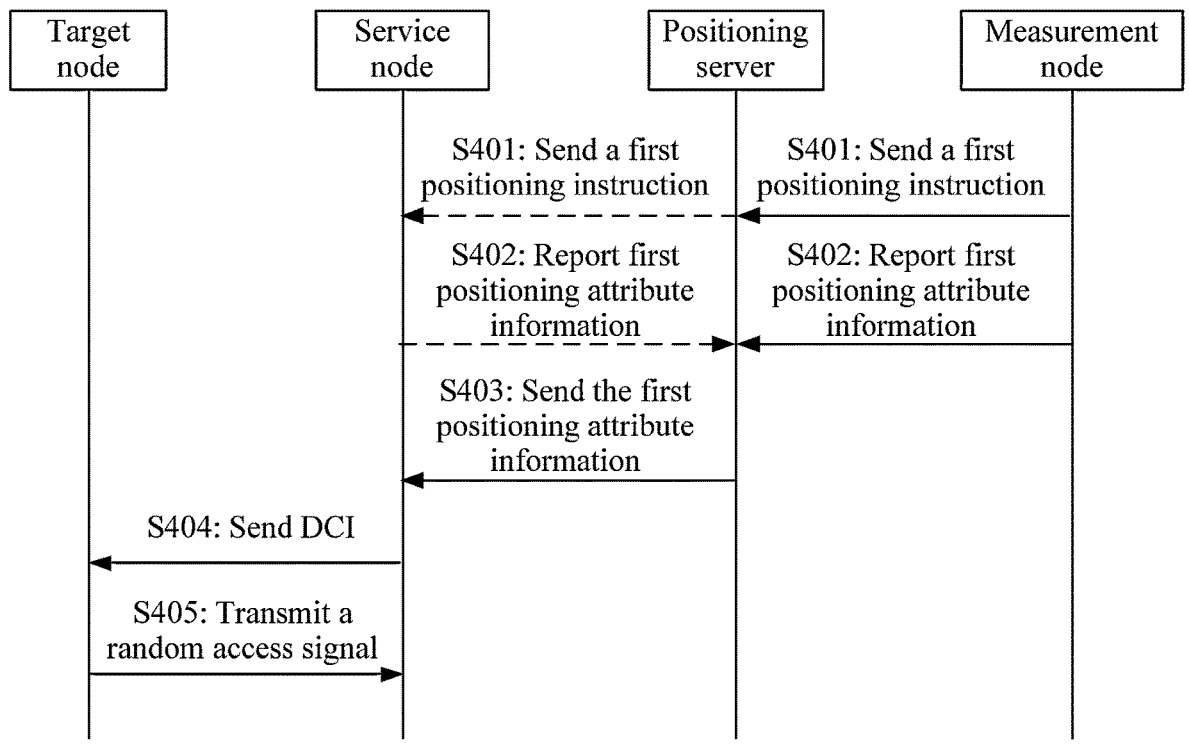
FIG. 5 is a schematic interaction diagram of another method for implementing uplink positioning according to an embodiment.

In an embodiment, FIG. 5 is a schematic interaction diagram of another method for implementing uplink positioning according to an embodiment. The method provided by the embodiment is suitable for estimating TAs of multiple measurement nodes under the scenario where a random access instruction is sent to a target node through a service node.

In an embodiment, one measurement node in a first measurement node set is a service node. As shown in FIG. 5, the method includes steps 401 to 405.

In step 401, a first positioning instruction is sent.

In step 402, first positioning attribute information is reported.

In step 403, the first positioning attribute information is sent.

In step 404, DCI is sent.

In step 405, a random access signal is transmitted.

In the embodiment, in a case where the DCI carrying the first positioning attribute information is sent to the target node through the service node, the service node may send a node identity of the service node and random access information of a cell where the service node is located to a positioning server, to store the node identity of the service node and the random access information of the cell where the service node is located, which facilitates subsequent invocation and use or inquiry. When the service node sends an identity of each measurement node in the first measurement node set and the random access information of the cell where each measurement node is located to the target node, it also needs to send the node identity of the service node and the random access information of the cell where the service node is located to the target node, so that the target node can transmit the random access signal to the service node and each measurement node.

Figure 6:
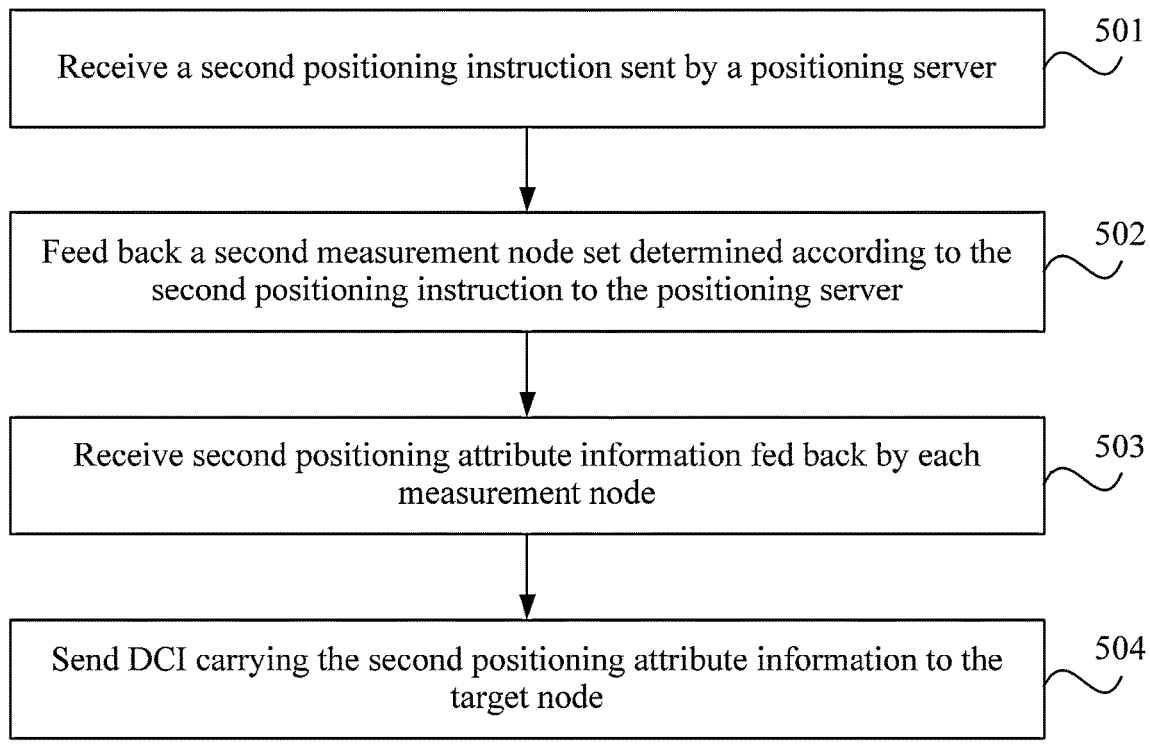
FIG. 6 is a flowchart of another method for implementing uplink positioning according to an embodiment.

In an embodiment, FIG. 6 is a flowchart of another method for implementing uplink positioning according to an embodiment. The method is executed by a service node to estimate TAs of multiple measurement nodes. As shown in FIG. 6, the method provided in this embodiment includes steps 501 to 504.

In step 501, a second positioning instruction sent by a positioning server is received.

In step 502, a second measurement node set determined according to the second positioning instruction is fed back to the positioning server.

The second measurement node set includes at least two measurement nodes except the service node, a target node is located within a coverage range of the at least two measurement nodes, and one service cell provided by the service node has established a communication connection with the target node.

In step 503, second positioning attribute information fed back by each measurement node is received.

The second positioning attribute information includes a measurement node identity and random access information of a cell where the each measurement node is located.

In step 504, DCI carrying the second positioning attribute information is sent to the target node.

The DCI is used for triggering the target node to send a random access signal to the each measurement node to determine a communication distance between the target node and the each measurement node.

In the embodiment, at least two measurement nodes used for positioning the target node are selected by the service node. In a case where uplink positioning needs to be performed on the target node, the positioning server sends the second positioning instruction to the service node, and the service node selects at least two measurement nodes to be used according to the second positioning instruction and reports each measurement node to the positioning server, so that the positioning server sends a first positioning activation instruction to each measurement node to trigger each measurement node to send the second positioning attribute information of the each measurement node to the service node. The first positioning activation instruction is configured to trigger each measurement node to feed back the second positioning attribute information to the service node. After the service node receives the second positioning attribute information of each measurement node, the service node configures the second positioning attribute information to obtain at least two pieces of DCI. Each piece of DCI is issued to the target node to trigger the target node to transmit the random access signal to the service node and each measurement node to determine the communication distance between the target node and each measurement node. In order to facilitate the target node to identify and obtain the identity of each corresponding measurement node and the random access signal of the cell where each measurement node is located according to the pieces of DCI, a one-to-one correspondence relationship may be set between the pieces of DCI and the measurement node identities, that is, each measurement node identity corresponds to a respective one piece of DCI.

Figure 7:
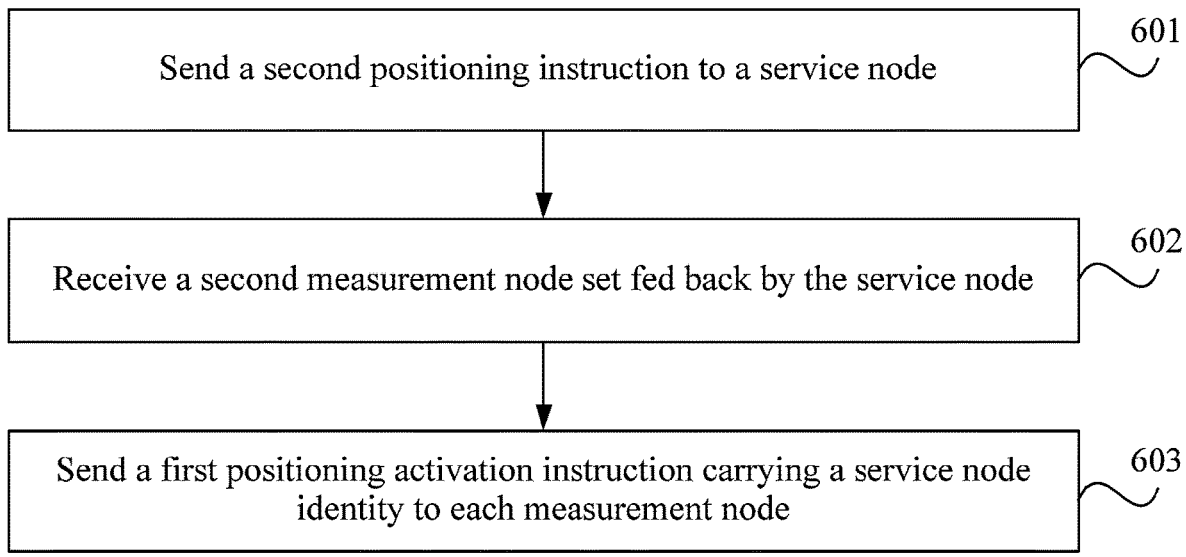
FIG. 7 is a flowchart of another method for implementing uplink positioning according to an embodiment.

In an embodiment, FIG. 7 is a flowchart of another method for implementing uplink positioning according to an embodiment. The method is executed by the positioning server to estimate TAs of multiple measurement nodes. As shown in FIG. 7, the method provided in this embodiment includes steps 601 to 603.

In step 601, a second positioning instruction is sent to a service node.

One service cell provided by the service node has established a communication connection with a target node.

In step 602, a second measurement node set fed back by the service node is received.

The second measurement node set is determined according to the second positioning instruction, where the second measurement node set includes at least two measurement nodes except the service node, and the target node is located within a coverage range of the at least two measurement nodes.

In step 603, a first positioning activation instruction carrying a service node identity is sent to each measurement node.

The first positioning activation instruction is configured to trigger each measurement node to send second positioning attribute information to the service node, the second positioning attribute information is attribute information of multiple measurement nodes with which the target node is to establish communication, and the second positioning attribute information includes a measurement node identity and random access information of a cell where the measurement nodes is located.

In the embodiment, in order to facilitate each measurement node to send the second positioning attribute information of the measurement node to the service node, when the positioning server issues the first positioning activation instruction to each measurement node, it also issues a service node identity to each measurement node.

Figure 8:
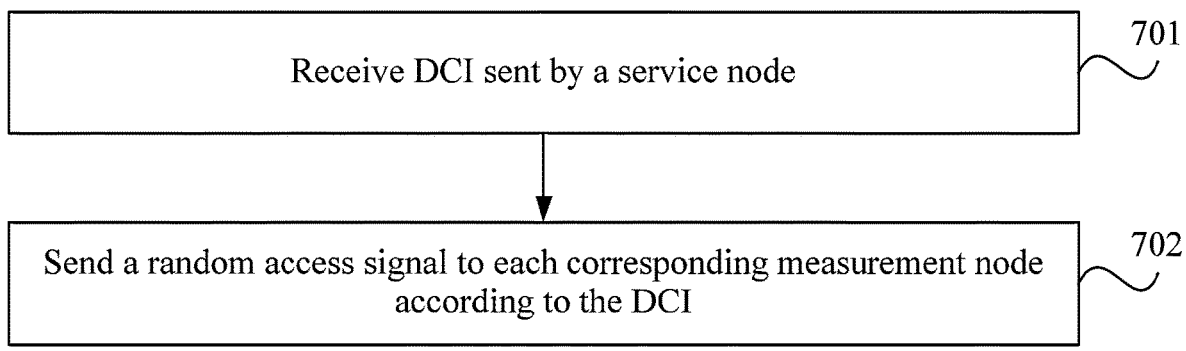
FIG. 8 is a flowchart of another method for implementing uplink positioning according to an embodiment.

In an embodiment, FIG. 8 is a flowchart of another method for implementing uplink positioning according to an embodiment. The method is executed by a target node to estimate TAs of multiple measurement nodes. As shown in FIG. 8, the method provided in this embodiment includes steps 701 to 702.

In step 701, DCI sent by a service node is received.

One service cell provided by the service node has established a communication connection with the target node.

In step 702, a random access signal is sent to a corresponding measurement node according to the DCI.

The random access signal is used for determining a communication distance between the target node and each measurement node.

In the embodiment, after the service node determines the second positioning attribute information of each measurement node used by the service node, the service node configures the second positioning attribute information to obtain corresponding DCI, and the target node transmits the random access signal to a corresponding measurement node according to each measurement node identity and the random access information of the cell where each measurement node is located in the DCI. The service node may also be used as a measurement node, that is, the target node also needs to transmit the random access signal to the service node.

Figure 9:
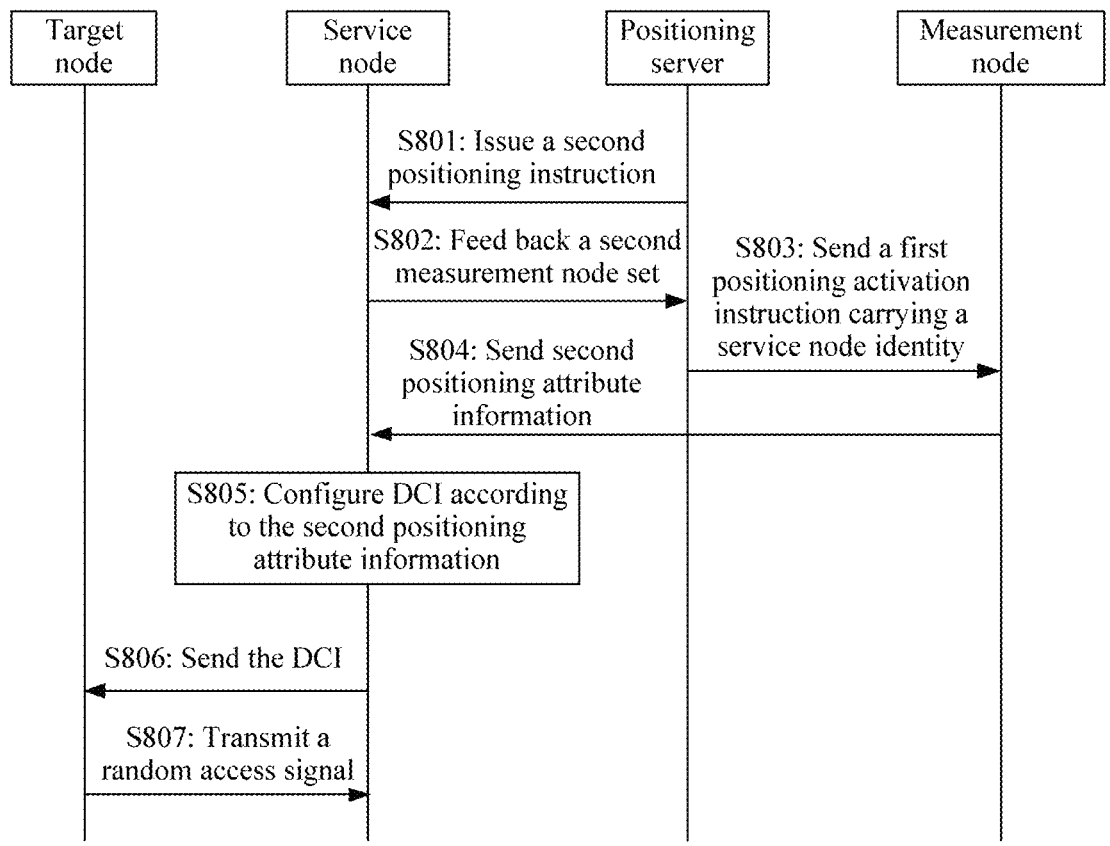
FIG. 9 is a schematic interaction diagram of another method for implementing uplink positioning according to an embodiment.

In an embodiment, FIG. 9 is a schematic interaction diagram of another method for implementing uplink positioning according to an embodiment. In this embodiment, the implementation method for uplink positioning is explained by the interactive communication among a target node, a service node, a positioning server and a measurement node. As shown in FIG. 9, the method provided in this embodiment includes steps 801 to 807.

In step 801, a second positioning instruction is issued.

In step 802, a second measurement node set is fed back.

The second measurement node set includes at least two measurement nodes except the service node, the target node is located within a coverage range of the at least two measurement nodes, and one service cell provided by the service node has established a communication connection with the target node.

In step 803, a first positioning activation instruction carrying a service node identity is sent.

In step 804, second positioning attribute information is sent.

The second positioning attribute information includes a measurement node identity and random access information of a cell where the measurement node is located.

In step 805, DCI is configured according to the second positioning attribute information.

The DCI is used for triggering the target node to send a random access signal to the measurement node to determine a communication distance between the target node and each measurement node.

In step 806, the DCI is sent.

In step 807, the random access signal is transmitted.

The random access signal is used for determining a communication distance between the target node and each measurement node.

In the embodiment, the positioning server issues the second positioning instruction to the service node, and after the service node receives the second positioning instruction, the service node at least two measurement node to be used and reports the at least two measurement node to the positioning server. The positioning server issues the first positioning activation instruction carrying the service node identity to each measurement node, and after each measurement node receives the first positioning activation instruction, each measurement node sends the second positioning attribute information of the measurement node to the service node. After the service node receives the second positioning attribute information sent by each measurement node, the service node configures the DCI and issues the DCI to the target node, so as to activate the target node to transmit the random access signal to each measurement node to determine the communication distance between the target node and each measurement node.

In an embodiment, after the target node sends the random access signal to the service node or each measurement node, in order to ensure that a transmit power of an uplink positioning reference signal sent by the target node to the service node or each measurement node is able to match a power of a transmit beam of the service node or a corresponding measurement node, a target transmit power of a corresponding uplink positioning reference signal sent by the target node needs to be adjusted. After the DCI carrying the second positioning attribute information is sent to the target node, the method further includes the following steps: uplink positioning reference signals sent by the target node and determined according to first configuration information and a relationship between each uplink positioning reference signal and a corresponding measurement node are received, a power adjustment parameter is determined according to a receive strength of the uplink positioning reference signal and the power adjustment parameter is returned to the target node, where the first configuration information includes multiple spatial correlations, multiple preset downlink positioning reference signals and multiple pieces of third positioning attribute information; the spatial correlations are used for characterizing a correlation between each preset downlink positioning reference signal and a corresponding uplink positioning reference signal; the third positioning attribute information includes a path loss measurement signal type, a path loss measurement signal identity, a path loss measurement signal time-frequency resource, a path loss measurement signal transmit power and a path loss measurement signal sequence; and the power adjustment parameter is used for adjusting a current transmit power of an uplink positioning reference signal sent by the target node to a corresponding measurement node to the target transmit power.

In the embodiment, the target node performs beam matching according to the third positioning attribute information of each measurement node and determines, in combination with the spatial correlations between the uplink positioning reference signals and the preset downlink positioning reference signals, a transmit beam and a current transmit power of a corresponding uplink positioning reference signal, and then the target node sends the uplink positioning reference signal to the service node according to the transmit beam and the current transmit power. The uplink positioning reference signals are signals corresponding to multiple measurement nodes. That is, in order to enable the service node to correspond a received power adjustment parameter to the uplink positioning reference signal and the measurement node, a relationship between each uplink positioning reference signal and a corresponding measurement node also needs to be sent while the target node sends the uplink positioning reference signals to the service node. After each measurement node receives a corresponding uplink positioning reference signal sent by the target node, each measurement node determines a power adjustment parameter according to a receive strength of the received uplink positioning reference signal, so that the target node adjusts a current transmit power of an uplink positioning reference signal sent by the target node to a corresponding measurement node to a target transmit power, thereby ensuring the accuracy of the transmit power of the uplink positioning reference signal transmitted by the target node, avoiding the waste of resources caused by excessive transmit power, and avoiding that the uplink positioning reference signal cannot be accurately received caused by too low transmit power.

In an embodiment, the step in which the power adjustment parameter is determined according to the receive strength of the uplink positioning reference signal includes the following steps: a power adjustment parameter is determined through the measurement node and according to a receive strength of a corresponding uplink positioning reference signal, and the power adjustment parameter returned by each measurement node is received.

In the embodiment, after each measurement node receives the uplink positioning reference signal sent by the target node, each measurement node determines a corresponding power adjustment parameter according to the receive strength of the received uplink positioning reference signal and returns the power adjustment parameter to the service node, so that the power adjustment parameter is sent to the target node through the service node.

In an embodiment, in order to enable the service node to determine uplink positioning reference information according to first configuration information, the first configuration information needs to be obtained. Before the uplink positioning reference signal sent by the target node and determined according to the first configuration information is received, the method further includes the following steps: a positioning configuration instruction sent by the positioning server and third positioning attribute information sent by the positioning server are received, spatial correlations of corresponding uplink signal resources are determined according to the preset downlink positioning reference signals of the measurement nodes, and sending the first configuration information to the target node. The positioning configuration instruction carries preset downlink positioning reference signals of multiple measurement nodes, the first configuration information includes the multiple spatial correlations, the multiple preset downlink positioning reference signals and the multiple pieces of third positioning attribute information.

In a case where the service node receives the positioning configuration instruction sent by the positioning server, the service node configures an uplink positioning reference signal of each measurement node, that is, a spatial correlation of a corresponding uplink signal resource is determined according to a preset downlink positioning reference signal of each measurement node, where the spatial correlation is used for characterizing a correlation between the uplink positioning reference signal and the preset downlink positioning reference signal, that is, a transmission channel and a time-frequency resource used by each uplink positioning reference signal and a corresponding preset downlink positioning reference signal are the same, while a transmission direction of the uplink positioning reference signal and a transmission direction of the corresponding preset downlink positioning reference signal are opposite. In an embodiment, the multiple pieces of third positioning attribute information are sent by the multiple measurement nodes.

In order to avoid the transfer of the multiple pieces of third positioning attribute information in the positioning server and reduce the transmission delay, the multiple pieces of third positioning attribute information corresponding to the multiple measurement nodes may be directly sent to the service node through the multiple measurement nodes.

In an embodiment, after the first positioning activation instruction carrying the service node identity is sent to each measurement node, the method further includes the following steps: in a case where radio resource management (RRM) measurement information sent by the target node is received, a third positioning instruction is sent to a first measurement node set, third positioning attribute information fed back by each measurement node and corresponding to the third positioning instruction is received, a preset downlink positioning reference signal of a corresponding measurement node is determined according to the RRM measurement information and the third positioning attribute information, and a positioning configuration instruction carrying the preset downlink positioning reference signals of the multiple measurement nodes and the third positioning attribute information are sent to the service node, where the first measurement node set includes at least three measurement nodes, the target node is located within a coverage range of the measurement nodes, and the RRM measurement information includes a downlink positioning reference signal type of the service node where the target node is located, an identity of a cell where the target node is located, and a position of a time-frequency domain resource where the target node is located; the third positioning attribute information is signal parameter information used by multiple measurement nodes for path loss measurement, and the third positioning attribute information includes a path loss measurement signal type, a path loss measurement signal identity, a path loss measurement signal time-frequency resource, a path loss measurement signal transmit power and a path loss measurement signal sequence.

In the embodiment, in a case where the target node that needs to be positioned sends RRM measurement information of the target node to the positioning service, the positioning server sends the third positioning instruction to the multiple measurement nodes used by the positioning server to obtain third positioning attribute information of each measurement node corresponding to the third positioning instruction. The positioning server identifies, in combination with an RRM measurement result of the target node and the path loss measurement signal available to each measurement node, a preset downlink positioning reference signal corresponding to each measurement node which may be better identified by the target node. The path loss measurement signal is determined by each measurement node according to the corresponding third positioning attribute information. The positioning server sends the determined preset downlink positioning reference signal and the third positioning attribute information corresponding to each measurement node to the service node.

In an embodiment, after the random access signal is sent to the corresponding measurement node according to the DCI, the method further includes the following steps: first configuration information sent by the service node is received, a transmit beam of an uplink positioning reference signal and a current transmit power of the uplink positioning reference signal are determined according to the first configuration information, the uplink positioning reference signal and a corresponding relationship between each uplink positioning reference signal and a corresponding measurement node are sent to the service node according to the transmit beam and the current transmit power, a power adjustment parameter corresponding to each uplink positioning reference signal returned by the service node is received, and a target transmit power of the uplink positioning reference signal is determined according to the power adjustment parameter, where the first configuration information includes multiple spatial correlations, multiple preset downlink positioning reference signals and multiple pieces of third positioning attribute information.

In the embodiment, the target node receives the first configuration information sent by the positioning server, determines the transmit beam of the uplink positioning reference signal and the current transmit power of the uplink positioning reference signal sent to each measurement node according to the first configuration information, and sends a corresponding uplink positioning reference signal to the service node and each measurement node according to the transmit beam and the current transmit power; the service node and each measurement node determine a corresponding power adjustment parameter according to the receive strength of the received uplink positioning reference signal; and each measurement node feeds back a corresponding power adjustment parameter to the service node, so that the service node sends the power adjustment parameter of the uplink positioning reference signal corresponding to each measurement node to the target node, and the target node adjusts the current transmit power of each uplink positioning reference signal to a corresponding target transmit power.

In an embodiment, before the first configuration information sent by the service node is received, the method further includes the following steps: RRM measurement information is sent to the service node, where the RRM measurement information includes a downlink positioning reference signal type of the service node where the target node is located, an identity of a cell where the target node is located, and a position of a time-frequency domain resource where the target node is located.

In the embodiment, the target node that needs to be positioned may directly send the RRM information to the positioning server, so that the positioning server identifies, in combination with the RRM measurement result and the path loss measurement signals available by multiple measurement nodes, the preset downlink reference signal corresponding to each measurement node which may be better identified by the target node.

In the embodiment, the target node that needs to be positioned may also send an RRM signal to the service node, in a case where the multiple measurement nodes directly send the pieces of the third positioning attribute information of the multiple measurement node to the service node, the service node may identify, through the RRM measurement result and the path loss measurement signal available by each measurement node, the preset downlink reference signal corresponding to each measurement node which may be better identified by the target node.

In an embodiment, the step in which the transmit beam of the uplink positioning reference signal and the current transmit power of the uplink positioning reference signal are determined according to the first configuration information includes the following steps: a transmit beam of a corresponding uplink positioning reference signal is determined according to the spatial correlations and the preset downlink positioning reference signals, and a current transmit power of the corresponding uplink positioning reference signal is determined according to the pieces of third positioning attribute information.

In an embodiment, the target node determines a transmit beam of an uplink positioning reference signal transmitted by the target node to a corresponding measurement node according to each preset downlink positioning reference signal and a corresponding spatial correlation, and determines a current transmit power of a corresponding uplink positioning reference signal according to a path loss measurement signal corresponding to the measurement node, so that the target node transmits the uplink positioning reference signal to the corresponding measurement node according to the transmit beam and the current transmit power of a corresponding uplink positioning reference signal transmitted by the target node to each measurement node.

Figure 10:
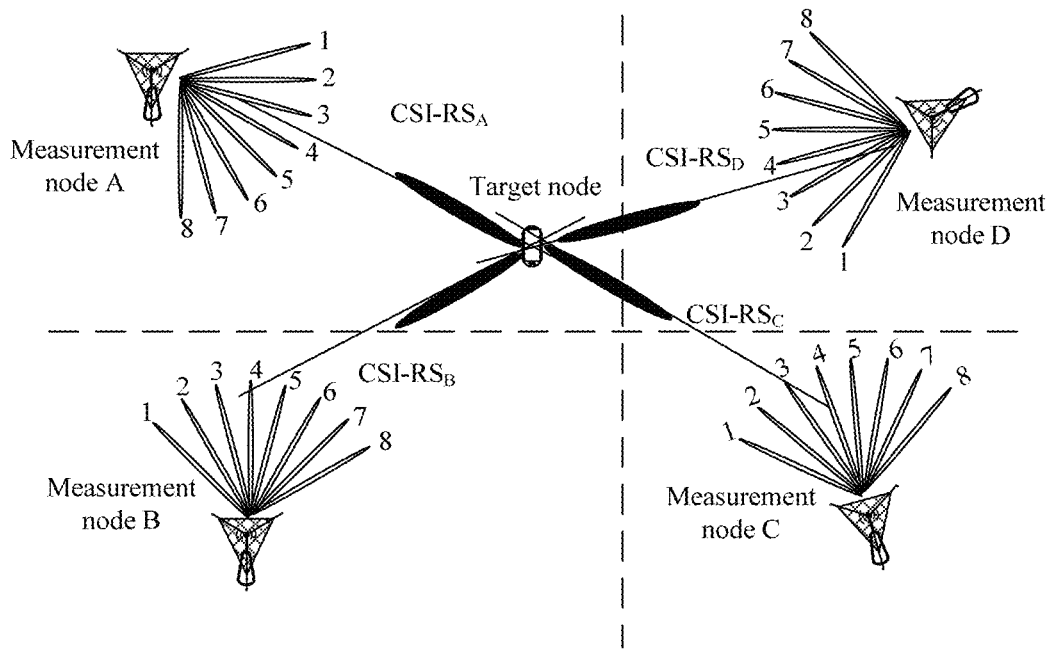
FIG. 10 is a schematic diagram of a communication scenario according to an embodiment.

In an embodiment, FIG. 10 is a schematic diagram of a communication scenario according to an embodiment. As shown in FIG. 10, in the communication scenario, one target node is provided, and a service base station of the one target node is configured as a measurement node A. Assuming that the target node can measure a downlink channel state information-reference signal (CSI-RS) of the measurement node A, a CSI-RS of a measurement node B, a CSI-RS of a measurement node C and a CSI-RS of a measurement node D, a positioning server selects the measurement nodes A, the measurement node B, the measurement node C and the measurement node D as measurement nodes used for uplink positioning, i.e. transmit nodes.

Figure 11:
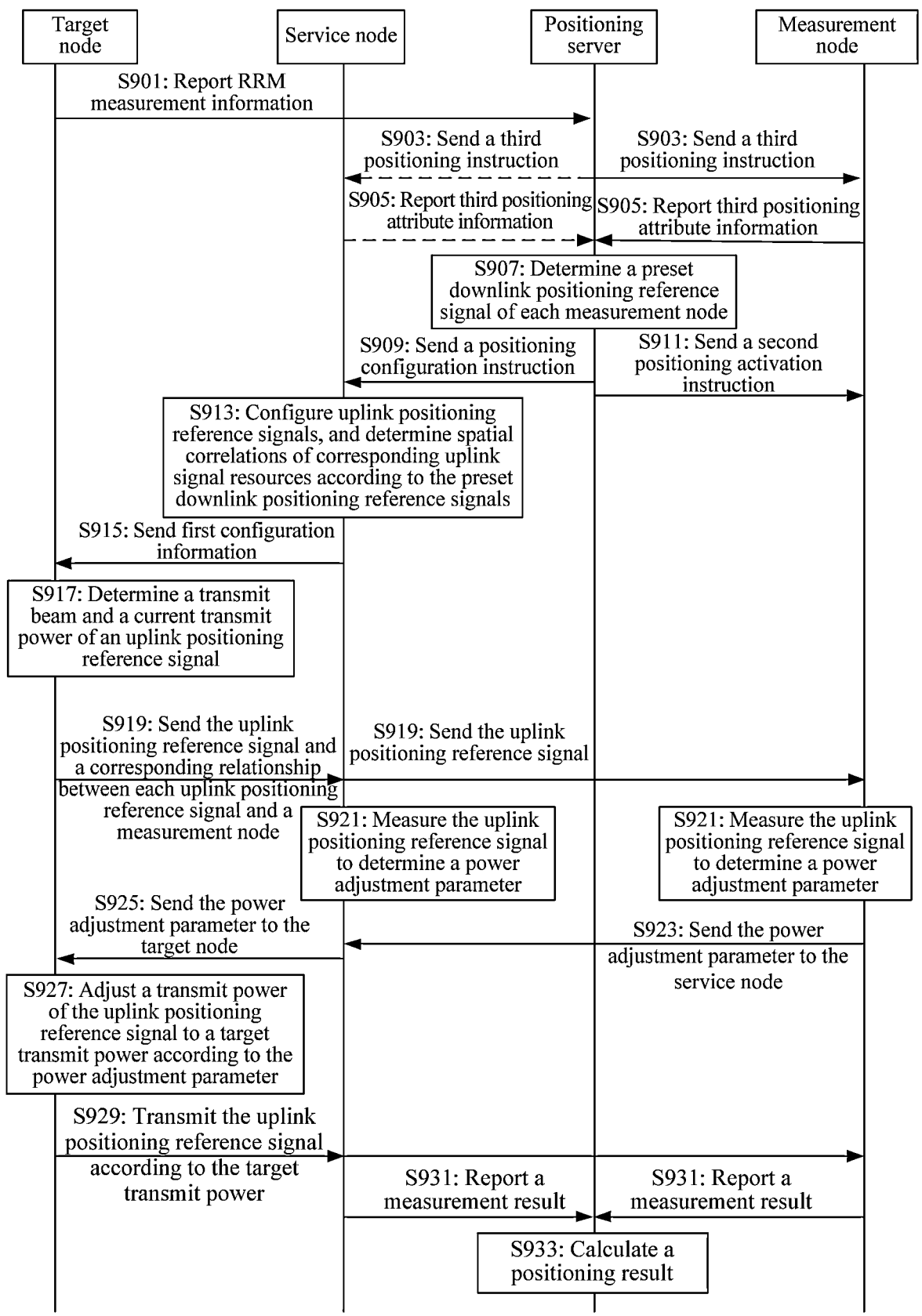
FIG. 11 is a schematic interaction diagram of another method for implementing uplink positioning according to an embodiment.

In an embodiment, FIG. 11 is a schematic interaction diagram of another method for implementing uplink positioning according to an embodiment. As shown in FIG. 11, the method includes steps described below.

In step 901, RRM measurement information is reported.

In step 903, a third positioning instruction is sent.

In step 905, third positioning attribute information is reported.

In step 907, a preset downlink positioning reference signal of each measurement node is determined.

In step 909, a positioning configuration instruction is sent.

In step 911, a second positioning activation instruction is sent.

In step 913, uplink positioning reference signals are configured, and spatial correlations of corresponding uplink signal resources are determined according to the preset downlink positioning reference signals.

In step 915, first configuration information is sent.

In step 917, a transmit beam of an uplink positioning reference signal and a current transmit power of the uplink positioning reference signal are determined.

In step 919, the uplink positioning reference signal and a corresponding relationship between each uplink positioning reference signal and a measurement node are sent.

In step 921, the uplink positioning reference signal is measured to determine a power adjustment parameter.

In step 923, the power adjustment parameter is sent to a service node.

In step 925, the power adjustment parameter is sent to a target node.

In step 927, a transmit power of the uplink positioning reference signal is adjusted to a target transmit power according to the power adjustment parameter.

In step 929, the uplink positioning reference signal is transmitted according to the target transmit power.

In step 931, a measurement result is reported.

In step 933, a positioning result is calculated.

In the embodiment, the target node that needs to be positioned reports RRM measurement information to a positioning server, where the RRM measurement information includes a downlink positioning reference signal type of the service node where the target node is located, an identity of a cell where the target node is located, and a position of a time-frequency domain resource where the target node is located. In this embodiment, it is assumed that the target node can measure a downlink CSI-RS of a base station A, a downlink CSI-RS of a base station B, a downlink CSI-RS of a base station C and a downlink CSI-RS of a base station D.

The positioning server selects the base station A, the base station B, the base station C and the base station D as the measurement nodes used in this positioning. The measurement node A is a service base station, i.e. the service node.

The positioning server sends the third positioning instruction to the measurement node A which is used as a service base station and all the measurement nodes used for this positioning, and requires each measurement node to report corresponding third positioning attribute information, where the third positioning attribute information is signal parameter information used by multiple measurement nodes for path loss measurement, and the third positioning attribute information includes a path loss measurement signal type, a path loss measurement signal identity, a path loss measurement signal time-frequency resource, a path loss measurement signal transmit power and a path loss measurement signal sequence, and further includes position information of the measurement node.

The service node and each measurement node report corresponding third positioning attribute information according to the third positioning instruction, and the positioning server identifies, in combination with an RRM measurement result and a path loss measurement signal available by each measurement node, a preset downlink reference signal corresponding to each measurement node which may be better identified by the target node. In this embodiment, $CSI\text{-}RS_A$ of the measurement node A, $CIS\text{-}RS_B$ of the measurement node B, $CSI\text{-}RS_C$ of the measurement node C and $CSI\text{-}RS_D$ of the measurement node D are obtained by comparing RRM measurement results. Each of these four signals may be used for measuring a path loss signal of a measurement node corresponding to the each of these four signals and may also be detected by the target node for RRM measurement at the same time. The $CSI\text{-}RS_A$ corresponds to the CIS-RS of the measurement node A, the $CSI\text{-}RS_B$ corresponds to the CIS-RS of the measurement node B, the $CSI\text{-}RS_C$ corresponds to the CIS-RS of the measurement node C, and the $CSI\text{-}RS_D$ corresponds to the CIS-RS of the measurement node D.

The positioning server sends the positioning configuration instruction to the service node (the measurement node A), that is, an uplink positioning reference signal configuration instruction. The instruction informs the service node to start configuring the uplink positioning reference signal to the target node. At the same time, the instruction indicates that the $CSI\text{-}RS_A$, the $CIS\text{-}RS_B$, the $CSI\text{-}RS_C$ and the $CSI\text{-}RS_D$ are preset downlink reference signals from the measurement node A, the measurement node B, the measurement node C and the measurement node D respectively, i.e. ideal downlink signals. At the same time, the second positioning activation instruction is sent to the measurement node A, the measurement node B, the measurement node C and the measurement node D, and is configured to indicate the measurement node A, the measurement node B, the measurement node C and the measurement node D to start measuring the uplink positioning reference signals of the target node. The measurement node A, the measurement node B, the measurement node C and the measurement node D measure the uplink positioning reference signals from the target node and report the measurement results to the positioning server, and the positioning server calculates a position.

The service node (the measurement node A) configures a downlink positioning reference signal resource of the measurement node A, a downlink positioning reference signal resource of the measurement node B, a downlink positioning reference signal resource of the measurement node C and a downlink positioning reference signal resource of the measurement node D to the target node, and these resources are a resource 1, a resource 2, a resource 3 and a resource 4 respectively. A downlink path loss measurement signal of the resource 1 is the $CSI\text{-}RS_A$, a downlink path loss measurement signal of the resource 2 is the $CSI\text{-}RS_B$, a downlink path loss measurement signal of the resource 3 is the $CSI\text{-}RS_C$, and a downlink path loss measurement signal of the resource 4 is the $CSI\text{-}RS_D$. The resource 1 has a spatial correlation with the signal $CSI\text{-}RS_A$, the resource 2 has a spatial correlation with the signal $CIS\text{-}RS_B$, the resource 3 has a spatial correlation with the signal $CSI\text{-}RS_C$, and the resource 4 has a spatial correlation with the signal $CSI\text{-}RS_D$. The first configuration information including multiple spatial correlations, multiple preset downlink positioning reference signals and multiple pieces of third positioning attribute information is sent to the target node.

In a case where the used path loss measurement signals have a one-to-one correspondence to signals of the target node for the RRM measurement, and the target node has known the optimum receive beams of multiple downlink positioning reference signals. Since there is a spatial correlation between the uplink signal resource corresponding to each uplink positioning reference signal and a CSI-RS corresponding to the measurement node, the target node may know the optimum transmit beam of each uplink signal resource to direct to the corresponding measurement node. The target node transmits an uplink positioning reference signal to a corresponding measurement node, and reports a corresponding relationship between the corresponding measurement node and the CSI-RS.

Each measurement node measures the uplink positioning reference signal transmitted by the target node, and configures a power adjustment parameter according to the magnitude of the receive strength, where measurement nodes (the measurement node B, the measurement node C and the measurement node D) adjacent to the service node (the measurement node A) send the power adjustment parameters to the service node.

The service node configures a power control parameter for the resource 1 according to the measurement of the service node, configures the received power control parameter of the measurement node B to the resource 2, configures a power control parameter from the measurement node C to the resource 3, configures a power control parameter from the measurement node D to the resource 4, and sends a resource adjustment parameter to the target node.

The target node adjusts transmit powers corresponding to the resource 1, the resource 2, the resource 3 and the resource 4 respectively to adjust to target transmit powers according to the received power adjustment parameters.

Figure 12:
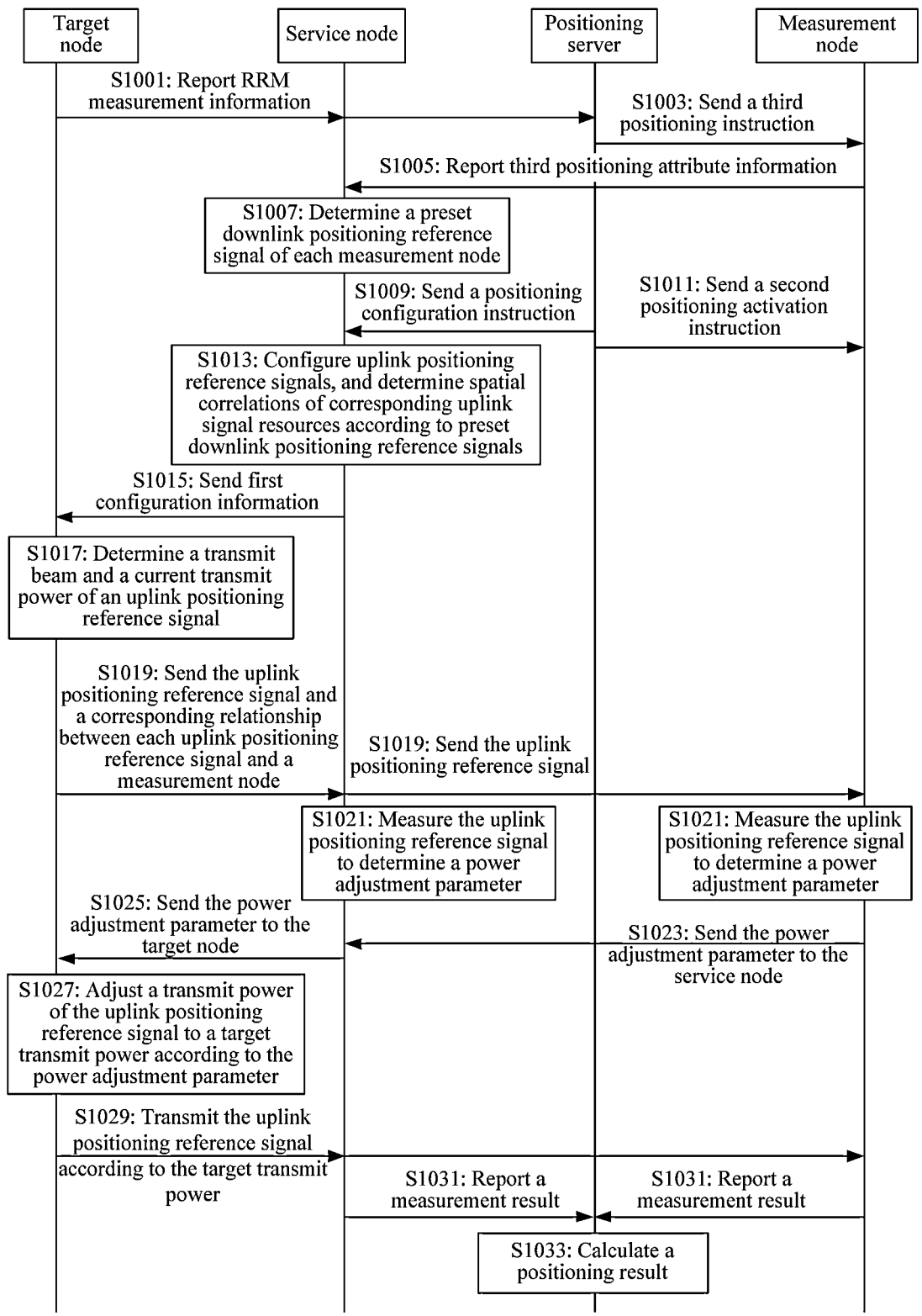
FIG. 12 is a schematic interaction diagram of another method for implementing uplink positioning according to an embodiment.

In an embodiment, FIG. 12 is a schematic interaction diagram of another method for implementing uplink positioning according to an embodiment. As shown in FIG. 12, the method includes steps described below.

In step 1001, RRM measurement information is reported.

In step 1003, a third positioning instruction is sent.

In step 1005, third positioning attribute information is reported.

In step 1007, a preset downlink positioning reference signal of each measurement node is determined.

In step 1009, a positioning configuration instruction is sent.

In step 1011, a second positioning activation instruction is sent.

In step 1013, uplink positioning reference signals are configured, and spatial correlations of corresponding uplink signal resources are determined according to the preset downlink positioning reference signals.

In step 1015, first configuration information is sent.

In step 1017, a transmit beam of an uplink positioning reference signal and a current transmit power of the uplink positioning reference signal are determined.

In step 1019, the uplink positioning reference signal and a corresponding relationship between each uplink positioning reference signal and a measurement node are sent.

In step 1021, the uplink positioning reference signal is measured to determine a power adjustment parameter.

In step 1023, the power adjustment parameter is sent to a service node.

In step 1025, the power adjustment parameter is sent to a target node.

In step 1027, a transmit power of the uplink positioning reference signal is adjusted to a target transmit power according to the power adjustment parameter.

In step 1029, the uplink positioning reference signal is transmitted according to the target transmit power.

In step 1031, a measurement result is reported.

In step 1033, a positioning result is calculated.

Steps 1001 to 1033 are explained as follows: steps 1001 to 1033 are in one-to-one correspondence with steps 901 to 933. The difference is that in a case where the target node reports the RRM measurement information, the target node may directly report the RRM measurement information to the service node, and in a case where each measurement node reports the third positioning attribute information, each measurement node may directly report the third positioning attribute information to the service node, thus avoiding the transfer of the third positioning attribute information in the positioning server and reducing the transmission delay. In a case where the third positioning attribute information is directly sent to the service node, a preset downlink positioning reference signal of each measurement node may be determined through the service node. The explanation of steps 1001 to 1033 is given in the description of steps 901 to 933 in the above described embodiments and will not be repeated herein.

Figure 13:
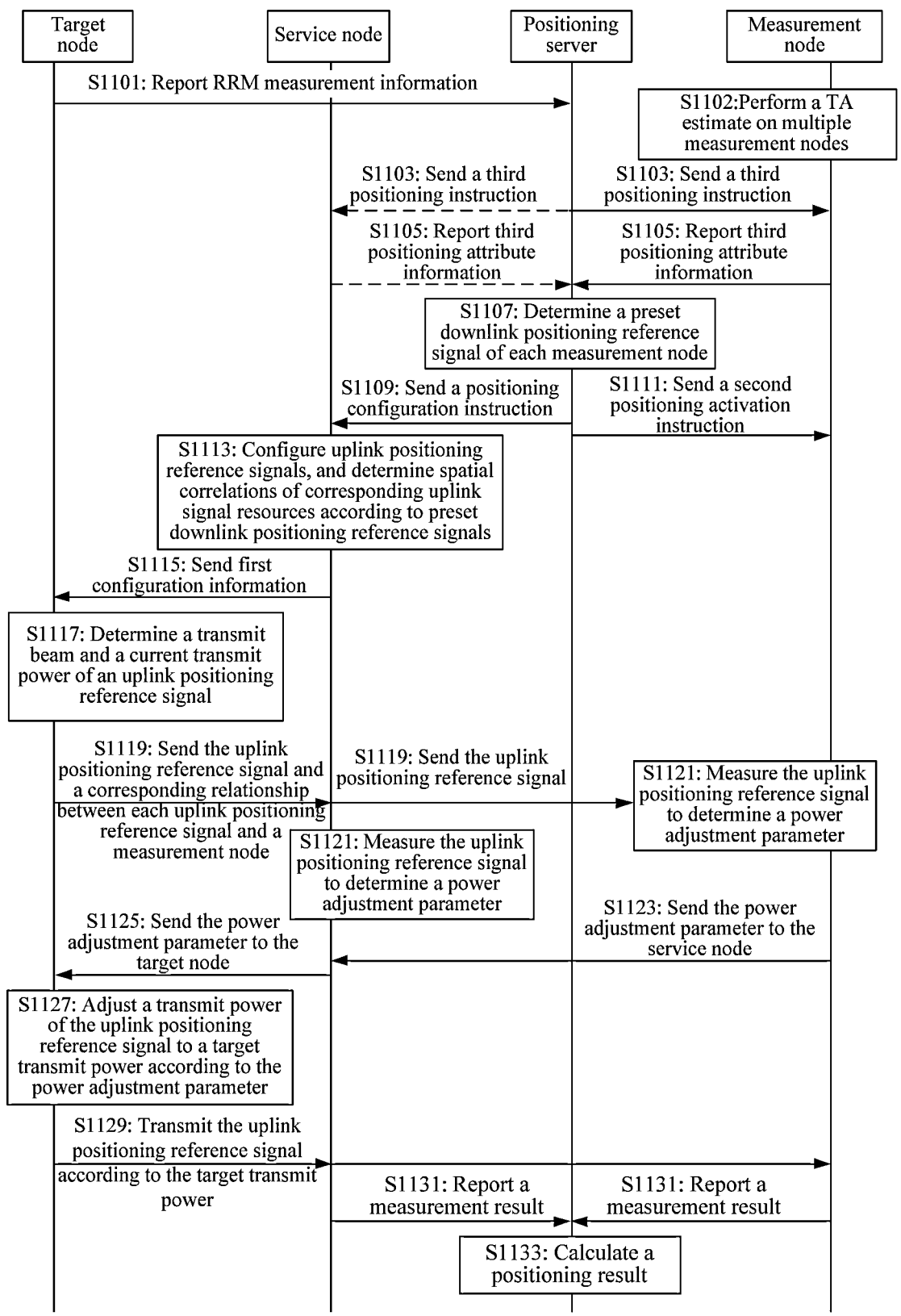
FIG. 13 is a schematic interaction diagram of another method for implementing uplink positioning according to an embodiment.

In an embodiment, FIG. 13 is a schematic interaction diagram of another method for implementing uplink positioning according to an embodiment. As shown in FIG. 13, the method includes steps described below.

In step 1101, RRM measurement information is reported.

In step 1102, a TA estimation is performed on multiple measurement nodes.

In step 1103, a third positioning instruction is sent.

In step 1105, third positioning attribute information is reported.

In step 1107, a preset downlink positioning reference signal of each measurement node is determined.

In step 1109, a positioning configuration instruction is sent.

In step 1111, a second positioning activation instruction is sent.

In step 1113, uplink positioning reference signals are configured, and spatial correlations of corresponding uplink signal resources are determined according to the preset downlink positioning reference signals.

In step 1115, first configuration information is sent.

In step 1117, a transmit beam of an uplink positioning reference signal and a current transmit power of the uplink positioning reference signal are determined.

In step 1119, the uplink positioning reference signal and a corresponding relationship between each uplink positioning reference signal and a measurement node are sent.

In step 1121, the uplink positioning reference signal is measured to determine a power adjustment parameter.

In step 1123, the power adjustment parameter is sent to a service node.

In step 1125, the power adjustment parameter is sent to a target node.

In step 1127, a transmit power of the uplink positioning reference signal is adjusted to a target transmit power according to the power adjustment parameter.

In step 1129, the uplink positioning reference signal is transmitted according to the target transmit power.

In step 1131, a measurement result is reported.

In step 1133, a positioning result is calculated.

Steps 1101 to 1133 are explained as follows: steps 1101 to 1133 are in one-to-one correspondence with steps 901 to 933. The difference is that after the target node reports the RRM measurement information, step 1102 is added to implement the TA estimations of multiple measurement nodes. For the implementation of the TA estimations for multiple measurement nodes, refer to the scheme of determining the communication distance between the target node and each measurement node in the above embodiments, which will not be described herein. After a TA value of each measurement node is determined, the TA value of each measurement node is sent to the target node through the service node, therefore in the process of transmitting the uplink positioning reference signal by the target node, each uplink signal resource is sent by using a corresponding TA value, that is, step 1119 in which the uplink positioning reference signal is transmitted includes that the uplink positioning reference signal is sent by using the TA value corresponding to the uplink signal resource of each measurement node.

In an embodiment, a transmit power control is only performed on the service node. After the service node receives the positioning activation instruction from the positioning server, the service node selects the used measurement nodes to and sends the used measurement nodes to the positioning server. The service node configures the uplink signal resource corresponding to the uplink positioning reference signal used by the target node, specifies the uplink signal resource corresponding to the uplink positioning reference signal corresponding to the service node, and determines an initial transmit power of the uplink signal resource and path loss measurement signal information. The target node measures a path loss measurement signal of the service node and performs beam matching to determine a transmit power and a transmit direction of the uplink signal resource corresponding to the uplink positioning reference signal sent to the service node, and the transmit power of the uplink signal resource corresponding to the uplink positioning reference signal sent to another measurement node is sent at full power. After the service node receives the uplink positioning reference signal of the target node, the service node performs the transmit power control on the uplink signal resource corresponding to the uplink positioning reference signal.

Figure 14:
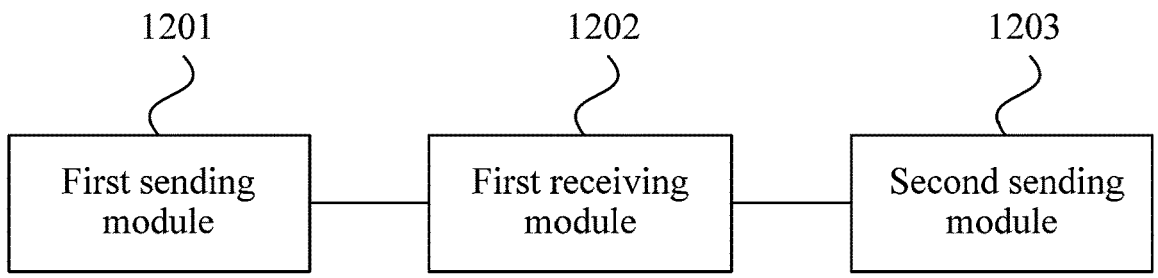
FIG. 14 is a block diagram illustrating a structure of an apparatus for implementing uplink positioning according to an embodiment.

In an embodiment, FIG. 14 is a block diagram illustrating a structure of an apparatus for implementing uplink positioning according to an embodiment. As shown in FIG. 14, an apparatus for implementing uplink positioning in this embodiment includes a first sending module 1201, a first receiving module 1202 and a second sending module 1203.

The first sending module 1201 is configured to send a first positioning instruction to a first measurement node set, where the first measurement node set includes at least three measurement nodes, and a target node is located within a coverage range of the measurement nodes.

The first receiving module 1202 is configured to receive first positioning attribute information fed back by each measurement node and corresponding to the first positioning instruction, where the first positioning attribute information includes a measurement node identity and random access information of a cell where the each measurement node is located.

The second sending module 1203 is configured to send a random access instruction carrying the first positioning attribute information to the target node, where the random access instruction is configured to trigger the target node to send a random access signal to the each measurement node to determine a communication distance between the target node and the each measurement node.

The apparatus for implementing uplink positioning provided in this embodiment is an apparatus for implementing uplink positioning of the embodiment shown in FIG. 2, and has a similar implementation principle and technical effect, which will not be described in detail herein.

In an embodiment, in a case where one measurement node in the first measurement node set is a service node, the second sending module 1203 includes a first sending unit and a second sending unit.

The first sending unit is configured to send the first positioning attribute information to the service node, where the service node is a base station cell which has established communication with the target node currently.

The second sending unit is configured to send, through the service node, DCI carrying the first positioning attribute information to the target node.

Figure 15:
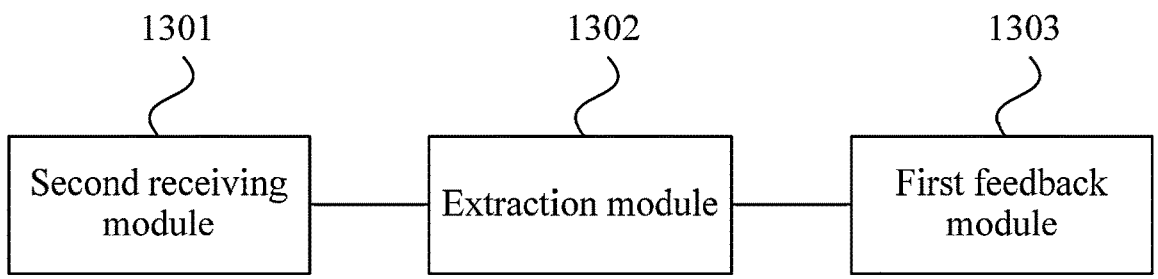
FIG. 15 is a block diagram illustrating a structure of another apparatus for implementing uplink positioning according to an embodiment.

In an embodiment, FIG. 15 is a block diagram illustrating a structure of another apparatus for implementing uplink positioning according to an embodiment. As shown in FIG. 15, an apparatus for implementing uplink positioning in this embodiment includes a second receiving module 1301, an extraction module 1302 and a first feedback module 1303.

The second receiving module 1301 is configured to receive a first positioning instruction sent by a positioning server.

The extraction module 1302 is configured to extract first positioning attribute information corresponding to the first positioning instruction according to the first positioning instruction, where the first positioning attribute information includes a measurement node identity and random access information of a cell where the measurement node is located.

The first feedback module 1303 is configured to feed back the first positioning attribute information to the positioning server, where the first positioning attribute information is attribute information of multiple measurement nodes with which a target node is to establish communication, and the first positioning attribute information includes a measurement node identity and random access information of a cell where the measurement node is located.

The apparatus for implementing uplink positioning provided in this embodiment is an apparatus for implementing uplink positioning of the embodiment shown in FIG. 3, and has a similar implementation principle and technical effect, which will not be described in detail herein.

Figure 16:
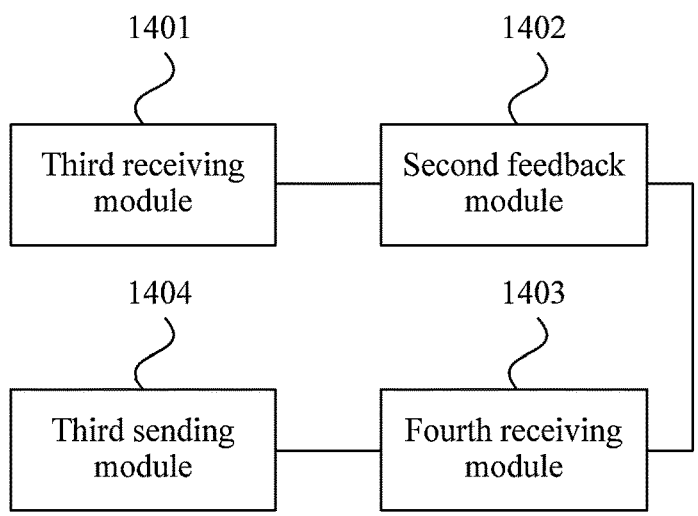
FIG. 16 is a block diagram illustrating a structure of another apparatus for implementing uplink positioning according to an embodiment.

In an embodiment, FIG. 16 is a block diagram illustrating a structure of another apparatus for implementing uplink positioning according to an embodiment. As shown in FIG. 16, an apparatus for implementing uplink positioning in this embodiment includes a third receiving module 1401, a second feedback module 1402, a fourth receiving module 1403 and a third sending module 1404.

The third receiving module 1401 is configured to receive a second positioning instruction sent by a positioning server.

The second feedback module 1402 is configured to feed back a second measurement node set determined according to the second positioning instruction to the positioning server, where the second measurement node set includes at least two measurement nodes except the service node, a target node is located within a coverage range of the measurement nodes, and one service cell provided by the service node has established a communication connection with the target node.

The fourth receiving module 1403 is configured to receive second positioning attribute information fed back by each measurement node, where the second positioning attribute information includes a measurement node identity and random access information of a cell where the each measurement node is located.

The third sending module 1404 is configured to send DCI carrying the second positioning attribute information to the target node, where the DCI is used for triggering the target node to send a random access signal to the each measurement node to determine a communication distance between the target node and the each measurement nodes.

In an embodiment, the apparatus for implementing uplink positioning further includes a seventh receiving module, a first determination module and a first return module.

The seventh receiving module is configured to receive, after the DCI carrying the second positioning attribute information is sent to the target node, uplink positioning reference signals sent by the target node and determined according to first configuration information and a corresponding relationship between each of the uplink positioning reference signals and a measurement node, where the first configuration information includes multiple spatial correlations, multiple preset downlink positioning reference signals and multiple pieces of third positioning attribute information, the multiple spatial correlations are used for characterizing a correlation between each of the multiple preset downlink positioning reference signals and a corresponding uplink positioning reference signal, and the third positioning attribute information includes a path loss measurement signal type, a path loss measurement signal identity, a path loss measurement signal time-frequency resource, a path loss measurement signal transmit power and a path loss measurement signal sequence.

The first determination module is configured to determine a power adjustment parameter according to a receive strength of the uplink positioning reference signal.

The first return module is configured to return the power adjustment parameter to the target node, where the power adjustment parameter is used for adjusting a current transmit power of an uplink positioning reference signal sent by the target node to a measurement node corresponding to the uplink positioning reference signal to a target transmit power.

In an embodiment, the first determination module includes a first determination unit and a first receiving unit.

The first determination unit is configured to determine, through the measurement node, a power adjustment parameter according to a receive strength of an uplink positioning reference signal corresponding to the measurement node.

The first receiving unit is configured to receive the power adjustment parameter returned by each measurement node.

In an embodiment, the apparatus for implementing uplink positioning further includes an eighth receiving module, a second determination module and a seventh sending module.

The eighth receiving module is configured to receive, before the uplink positioning reference signals sent by the target node and determined according to the first configuration information are received, a positioning configuration instruction sent by the positioning server and third positioning attribute information sent by the positioning server, where the positioning configuration instruction carries preset downlink positioning reference signals of multiple measurement nodes.

The second determination module is configured to determine spatial correlations of corresponding uplink signal resources according to the preset downlink positioning reference signals of the multiple measurement nodes.

The seventh sending module is configured to send the first configuration information to the target node, where the first configuration information includes the multiple spatial correlations, the multiple preset downlink positioning reference signals and the multiple pieces of third positioning attribute information.

In an embodiment, the multiple pieces of third positioning attribute information are sent by the multiple measurement nodes.

The apparatus for implementing uplink positioning provided in this embodiment is an apparatus for implementing uplink positioning of the embodiment shown in FIG. 6, and has a similar implementation principle and technical effect, which will not be described in detail herein.

Figure 17:
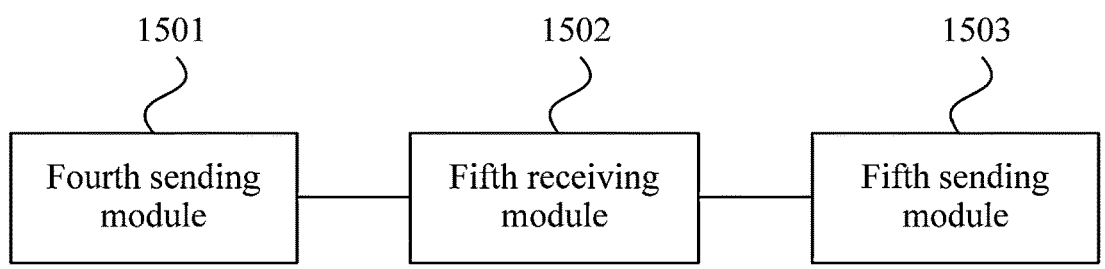
FIG. 17 is a block diagram illustrating a structure of another apparatus for implementing uplink positioning according to an embodiment.

In an embodiment, FIG. 17 is a block diagram illustrating a structure of another apparatus for implementing uplink positioning according to an embodiment. As shown in FIG. 17, an apparatus for implementing uplink positioning in this embodiment includes a fourth sending module 1501, a fifth receiving module 1502 and a fifth sending module 1503.

The fourth sending module 1501 is configured to send a second positioning instruction to a service node, where one service cell provided by the service node has established a communication connection with a target node.

The fifth receiving module 1502 is configured to receive a second measurement node set fed back by the service node, where the second measurement node set is determined according to the second positioning instruction, the second measurement node set includes at least two measurement nodes except the service node, and the target node is located within a coverage range of the measurement nodes.

The fifth sending module 1503 is configured to send a first positioning activation instruction carrying a service node identity to each measurement node, where the first positioning activation instruction is configured to trigger the each measurement node to send second positioning attribute information to the service node, the second positioning attribute information is attribute information of multiple measurement nodes with which the target node is to establish communication, and the second positioning attribute information includes a measurement node identity and random access information of a cell where the each measurement node is located.

In an embodiment, the apparatus for implementing uplink positioning further includes an eighth sending module, a ninth receiving module, a third determination module and a tenth sending module.

The eighth sending module is configured to send, after the first positioning activation instruction carrying the service node identity is sent to each measurement node, a third positioning instruction to a first measurement node set in response to receiving RRM measurement information sent by the target node, where the first measurement node set includes at least three measurement nodes, the target node is located within a coverage range of the measurement nodes, and the RRM measurement information includes a downlink positioning reference signal type of the service node where the target node is located, an identity of a cell where the target node is located, and a position of a time-frequency domain resource where the target node is located.

The ninth receiving module is configured to receive third positioning attribute information fed back by each measurement node and corresponding to the third positioning instruction, where the third positioning attribute information is signal parameter information used by multiple measurement nodes for path loss measurement, and the third positioning attribute information includes a path loss measurement signal type, a path loss measurement signal identity, a path loss measurement signal time-frequency resource, a path loss measurement signal transmit power and a path loss measurement signal sequence.

The third determination module is configured to determine a preset downlink positioning reference signal of a corresponding measurement node according to the RRM measurement information and the third positioning attribute information.

The tenth sending module is configured to send a positioning configuration instruction and the third positioning attribute information to the service node, where the positioning configuration instruction carries the preset downlink positioning reference signals of the multiple measurement nodes.

The apparatus for implementing uplink positioning provided in this embodiment is an apparatus for implementing uplink positioning of the embodiment shown in FIG. 7, and has a similar implementation principle and technical effect, which will not be described in detail herein.

Figure 18:
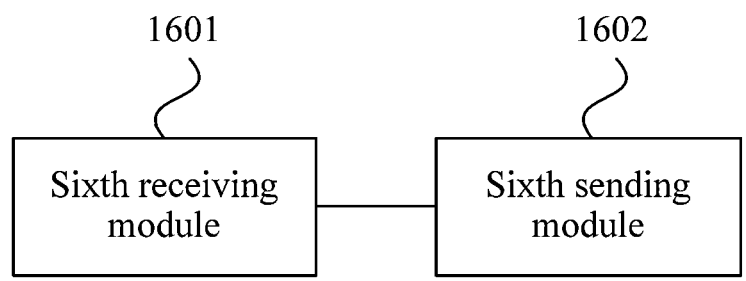
FIG. 18 is a block diagram illustrating a structure of another apparatus for implementing uplink positioning according to an embodiment.

In an embodiment, FIG. 18 is a block diagram illustrating a structure of an apparatus for implementing uplink positioning according to an embodiment. As shown in FIG. 18, an apparatus for implementing uplink positioning in this embodiment includes a sixth receiving module 1601 and a sixth sending module 1602.

The sixth receiving module 1601 is configured to receive DCI sent by a service node, where one service cell provided by the service node has established a communication connection with the target node.

The sixth sending module 1602 is configured to send a random access signal to a measurement node corresponding to the DCI according to the DCI, where the random access signal is used for determining a communication distance between the target node and each measurement node.

In an embodiment, the apparatus for implementing uplink positioning further includes a tenth receiving module, a fourth determination module, an eleventh sending module, an eleventh receiving module and a fifth determination module.

The tenth receiving module is configured to receive, after the random access signal is sent to the measurement node corresponding to the DCI according to the DCI, receive first configuration information sent by the service node, where the first configuration information includes multiple spatial correlations, multiple preset downlink positioning reference signals and multiple pieces of third positioning attribute information.

The fourth determination module is configured to determine a transmit beam of an uplink positioning reference signal and a current transmit power of the uplink positioning reference signal according to the first configuration information.

The eleventh sending module is configured to send, according to the transmit beam and the current transmit power, the uplink positioning reference signal and a corresponding relationship between each uplink positioning reference signal and a measurement node to the service node.

The eleventh receiving module is configured to receive a power adjustment parameter corresponding to each uplink positioning reference signal returned by the service node.

The fifth determination module is configured to determine a target transmit power of the each uplink positioning reference signal according to the power adjustment parameter.

In an embodiment, the apparatus for implementing uplink positioning further includes a twelfth sending module.

The twelfth sending module is configured to send, before the first configuration information sent by the service node is received, RRM measurement information to the service node, where the RRM measurement information includes a downlink positioning reference signal type of the service node where the target node is located, an identity of a cell where the target node is located, and a position of a time-frequency domain resource where the target node is located.

In an embodiment, the fourth determination module includes a second determination unit and a third determination unit.

The second determination unit is configured to determine a transmit beam of a corresponding uplink positioning reference signal according to the spatial correlations and the preset downlink positioning reference signals.

The third determination unit is configured to determine a current transmit power of the corresponding uplink positioning reference signal according to the pieces of third positioning attribute information.

The apparatus for implementing uplink positioning provided in this embodiment is an apparatus for implementing uplink positioning of the embodiment shown in FIG. 8, and has a similar implementation principle and technical effect, which will not be described in detail herein.

Figure 19:
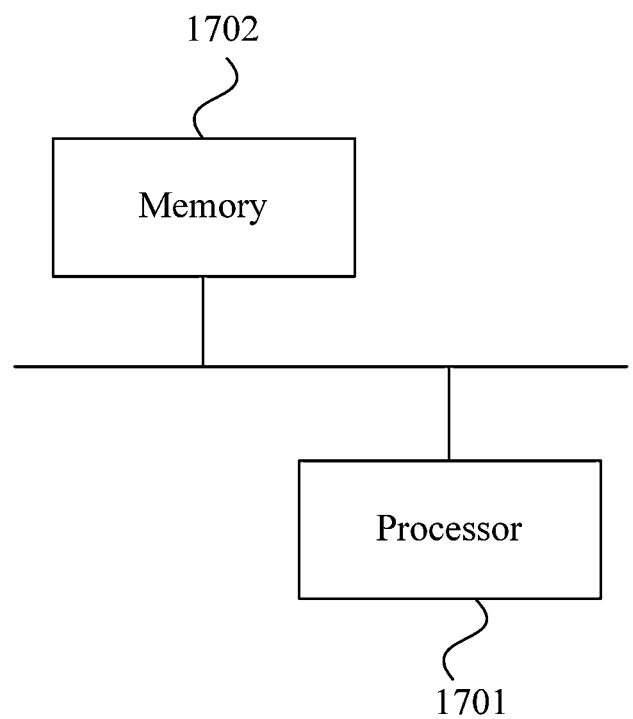
FIG. 19 is a structure diagram of a device according to an embodiment.

In an embodiment, FIG. 19 is a structure diagram of a device according to an embodiment. As shown in FIG. 19, the device provided in the present application includes a processor 1701 and a memory 1702. The number of processors 1701 in the device may be one or more, and FIG. 19 is illustrated by using an example in which there is one processor 1701. The number of memories 1702 in the device may be one or more, and FIG. 19 is illustrated by using an example in which there is one memory 1702. The processor 1701 and the memory 1702 of the device are connected by a bus or in other manners, and FIG. 19 is illustrated by using an example of the connection by the bus. In an embodiment, the device is a positioning server.

The memory 1702, as a computer-readable storage medium, may be configured to store software programs and computer-executable programs and modules, such as program instructions/modules (e.g., a first sending module 1201, a first receiving module 1202 and a second sending module 1203 in an apparatus of an awake terminal) corresponding to the device of any embodiment of the present application. The memory 1702 may include a program storage region and a data storage region, where the program storage region may store an operating system and an application program required by at least one function while the data storage region may store data created depending on use of the device. Moreover, the memory 1702 may include a high-speed random access memory, and may further include a nonvolatile memory such as at least one disk memory, flash memory or another nonvolatile solid state memory. In some examples, the memory 1702 may include memories which are remotely disposed relative to the processor 1701 and these remote memories may be connected to the device via a network. The examples of the preceding network include, but are not limited to, the Internet, an intranet, a local area network, a mobile communication network, and a combination thereof.

The positioning server provided above may be configured to execute the method for implementing uplink positioning applied to the positioning server and provided by any embodiment described above, and has corresponding functions and effects.

In an embodiment, in a case where the device is a measurement node, the device may perform the method for implementing uplink positioning applied to the measurement node and provided by any embodiment, and has corresponding functions and effects.

In an embodiment, in a case where the device is a service node, the device may perform the method for implementing uplink positioning applied to the service node and provided by any embodiment, and has corresponding functions and effects.

In an embodiment, in a case where the device is a target node, the device may perform the method for implementing uplink positioning applied to the target node and provided by any embodiment, and has corresponding functions and effects.

The term user terminal encompasses any appropriate type of radio user device, such as a mobile phone, a portable data processing apparatus, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other calculating apparatuses, although the present application is not limited thereto.

In an embodiment, a storage medium including computer-executable instructions is provided by an embodiment of the present application, where the computer-executable instructions are configured to, when executed by a computer processor, perform a method for implementing uplink positioning applied to the positioning server. In the storage medium including computer-executable instructions provided by the embodiment of the present application, the computer-executable instructions implement not only the above operations in the method for implementing uplink positioning of the positioning server but also related operations in the method for implementing uplink positioning of the positioning server provided by any embodiment of the present application, and have corresponding functions and effects.

In an embodiment, a storage medium including computer-executable instructions is provided by an embodiment of the present application, where the computer-executable instructions are configured to, when executed by a computer processor, perform a method for implementing uplink positioning applied to the measurement node.

In an embodiment, a storage medium including computer-executable instructions is provided by an embodiment of the present application, where the computer-executable instructions are configured to, when executed by a computer processor, perform a method for implementing uplink positioning applied to the service node.

In an embodiment, a storage medium including computer-executable instructions is provided by an embodiment of the present application, where the computer-executable instructions are configured to, when executed by a computer processor, perform a method for implementing uplink positioning applied to the target node.

Embodiments of the present application may be implemented by a data processor of a mobile apparatus executing computer program instructions. The implementation, for example, may be in a processor entity, by hardware, or by a combination of software and hardware. The computer program instructions may be assembly instructions, instruction set architecture (ISA) instructions, machine instructions, machine-related instructions, micro-codes, firmware instructions, state setting data, or source or object codes written in any combination of one or more programming languages.

A block diagram of any logic flow in drawings of the present application may represent program steps, or may represent interconnected logic circuits, modules, and functions, or may represent a combination of program steps, logic circuits, modules, and functions. The computer program may be stored in a memory. The memory may be of any type suitable to the local technical environment and may be implemented using any suitable data storage technology such as, but not limited to, a read-only memory (ROM), a random access memory (RAM), an optical memory device and system (digital video disc (DVD) or compact disc (CD)), and the like. The computer-readable storage medium may include a non-transitory storage medium. The data processor may be of any type appropriate for the local technical environment such as, but not limited to, a general purpose computer, a special purpose computer, a microprocessor, a digital signal processor (DSP), an application specific integrated circuit (ASIC), a field-programmable gate array (FPGA), and a processor based on a multi-core processor architecture.

What is claimed is:

1. A method for implementing uplink positioning, applied to a positioning server, comprising:
    sending a first positioning instruction to a first measurement node set, wherein the first measurement node set comprises at least three measurement nodes, and a target node is located within a coverage range of the at least three measurement nodes;
    receiving first positioning attribute information fed back by each measurement node of the at least three measurement nodes and corresponding to the first positioning instruction, wherein the first positioning attribute information comprises a measurement node identity of each measurement node and random access information of a cell where the each measurement node is located; and
    sending a random access instruction carrying the first positioning attribute information to the target node, wherein the random access instruction is configured to trigger the target node to send a random access signal to the each measurement node to determine a communication distance between the target node and the each measurement node.

2. The method of claim 1, wherein in a case where one measurement node in the first measurement node set is a service node, sending the random access instruction carrying the first positioning attribute information to the target node comprises:
    sending the first positioning attribute information to the service node, wherein the service node is a base station cell which has established communication with the target node; and
    sending, through the service node, downlink control information (DCI) carrying the first positioning attribute information to the target node.

3. A method for implementing uplink positioning, applied to a positioning server, comprising:
    sending a second positioning instruction to a service node, wherein one service cell provided by the service node has established a communication connection with a target node;
    receiving a second measurement node set fed back by the service node, wherein the second measurement node set is determined according to the second positioning instruction, the second measurement node set comprises at least two measurement nodes except the service node, and the target node is located within a coverage range of the at least two measurement nodes; and
    sending a first positioning activation instruction carrying a service node identity to each measurement node of the at least two measurement nodes, wherein the first positioning activation instruction is configured to trigger the each measurement node to send second positioning attribute information to the service node, the second positioning attribute information is attribute information of each measurement node with which the target node is to establish communication, and the second positioning attribute information comprises a measurement node identity of each measurement node and random access information of a cell where the each measurement node is located.

4. The method of claim 3, after sending the first positioning activation instruction carrying the service node identity to the each measurement node of the at least two measurement nodes, further comprising:
    in response to receiving radio resource management (RRM) measurement information sent by the target node, sending a third positioning instruction to a first measurement node set, wherein the first measurement node set comprises at least three measurement nodes, the target node is located within a coverage range of the at least three measurement nodes, and the RRM measurement information comprises a downlink positioning reference signal type of a service node where the target node is located, an identity of a cell where the target node is located, and a position of a time-frequency domain resource where the target node is located;
    receiving third positioning attribute information fed back by each measurement node of the at least three measurement nodes and corresponding to the third positioning instruction, wherein the third positioning attribute information is signal parameter information used by each measurement node for path loss measurement, and the third positioning attribute information comprises a path loss measurement signal type, a path loss measurement signal identity, a path loss measurement signal time-frequency resource, a path loss measurement signal transmit power and a path loss measurement signal sequence;
    determining a preset downlink positioning reference signal of a corresponding measurement node according to the RRM measurement information and the third positioning attribute information; and sending a positioning configuration instruction and the third positioning attribute information to the service node, wherein the positioning configuration instruction carries the preset downlink positioning reference signals of each measurement node.

5. An apparatus for implementing uplink positioning, applied to a positioning server, comprising: a processor, and a memory for storing a computer program executable by the processor, wherein the computer program, when executed by the processor, is configured to perform the method for implementing uplink positioning of claim 1.

6. An apparatus for implementing uplink positioning, applied to a positioning server, comprising: a processor, and a memory for storing a computer program executable by the processor, wherein the computer program, when executed by the processor, is configured to perform the method for implementing uplink positioning of claim 3.

7. A non-transitory computer-readable_storage medium storing a computer program, wherein the computer program, when executed by a processor, implements the method for implementing uplink positioning of claim 1.

* * * * *